(12) United States Patent
Levine et al.

(10) Patent No.: US 12,460,350 B2
(45) Date of Patent: Nov. 4, 2025

(54) DISCRETIZED PATTERNED BELT FOR TISSUES, TOWELS, AND NONWOVENS

(71) Applicant: Albany International Corp., Rochester, NH (US)

(72) Inventors: Mark J. Levine, Appleton, WI (US); Erin Lynn Camponeschi Brotherson, Avondale, PA (US); Robert Hansen, North Muskegon, MI (US); Christopher J. Hazel, Neenah, WI (US)

(73) Assignee: Albany International Corp, Rochester, NH (US)

( * ) Notice: Subject to any disclaimer, the term of this patent is extended or adjusted under 35 U.S.C. 154(b) by 340 days.

(21) Appl. No.: 17/900,316

(22) Filed: Aug. 31, 2022

(65) Prior Publication Data

US 2023/0332353 A1    Oct. 19, 2023

Related U.S. Application Data

(60) Provisional application No. 63/332,629, filed on Apr. 19, 2022.

(51) Int. Cl.
*D21F 7/08* (2006.01)
*D06M 15/333* (2006.01)
(Continued)

(52) U.S. Cl.
CPC .......... *D21F 7/083* (2013.01); *D06M 15/333* (2013.01); *D06M 15/507* (2013.01);
(Continued)

(58) Field of Classification Search
CPC ......... D21F 7/083; D21F 11/06; D21H 27/02; D06M 15/333; D06M 15/507; D06M 15/564; D06M 15/59; D06M 23/16
See application file for complete search history.

(56) References Cited

U.S. PATENT DOCUMENTS

| 4,514,345 A | 4/1985 | Johnson et al. |
| 4,528,239 A | 7/1985 | Trokhan |

(Continued)

FOREIGN PATENT DOCUMENTS

| EP | 1 153 170 B1 | 12/2003 |
| EP | 2 130 970 A1 | 12/2009 |

(Continued)

OTHER PUBLICATIONS

Liu, Jinxin et al.: "Low resistance bicomponent spunbond materials for fresh air filtration with ultra-high dust holding capacity", RSC Advances, 2017, 7, pp. 43879-43887.
(Continued)

*Primary Examiner* — Jose A Fortuna
(74) *Attorney, Agent, or Firm* — McCarter & English, LLP

(57) ABSTRACT

The invention relates to an industrial fabric, such as a texturing belt, used to create three-dimensional structures in a product produced thereon, e.g., in the papermaking field, such as for fiber products, and in nonwoven processes. The invention concerns a texturing belt that can impart an endless variety of complex patterns utilizing discretization, such as, wherein individual subunits that comprise a pattern element are not connected, and therefore do not act as a stressed member of the texturing belt.

29 Claims, 29 Drawing Sheets

(51) Int. Cl.
*D06M 15/507* (2006.01)
*D06M 15/564* (2006.01)
*D06M 15/59* (2006.01)
*D06M 23/16* (2006.01)
*D21F 11/00* (2006.01)
*D21H 27/02* (2006.01)

(52) U.S. Cl.
CPC .......... *D06M 15/564* (2013.01); *D06M 15/59* (2013.01); *D06M 23/16* (2013.01); *D21F 11/006* (2013.01); *D21H 27/02* (2013.01)

(56) References Cited

U.S. PATENT DOCUMENTS

| | | | |
|---|---|---|---|
| 5,260,171 A | 11/1993 | Smurkoski et al. | |
| 5,275,700 A | 1/1994 | Trokhan | |
| 5,364,504 A | 11/1994 | Smurkoski et al. | |
| 5,431,786 A | 7/1995 | Rasch et al. | |
| 5,503,715 A | 4/1996 | Trokhan et al. | |
| 5,674,663 A * | 10/1997 | McFarland | B29C 35/10 430/327 |
| 5,679,222 A | 10/1997 | Rasch et al. | |
| 5,714,041 A | 2/1998 | Ayers et al. | |
| 5,948,210 A | 9/1999 | Huston | |
| 6,010,598 A | 1/2000 | Boutilier et al. | |
| 6,358,594 B1 | 3/2002 | Ampulski | |
| 6,660,362 B1 * | 12/2003 | Lin | D21F 11/145 162/902 |
| 6,733,833 B2 | 5/2004 | Ampulski | |
| 6,743,571 B1 | 6/2004 | Hill et al. | |
| 6,860,970 B2 | 3/2005 | Ampulski | |
| 7,005,044 B2 * | 2/2006 | Kramer | D21F 11/006 427/195 |
| 7,094,320 B1 | 8/2006 | Phan | |
| 7,914,649 B2 | 3/2011 | Ostendorf et al. | |
| 8,287,693 B2 | 10/2012 | Phan et al. | |
| 8,298,376 B2 | 10/2012 | Polat et al. | |
| 8,313,617 B2 | 11/2012 | Polat et al. | |
| 8,506,759 B2 | 8/2013 | Spitzer et al. | |
| 9,011,644 B1 | 4/2015 | Werth et al. | |
| 10,214,856 B2 | 2/2019 | Manifold et al. | |
| 10,233,593 B2 | 3/2019 | Manifold et al. | |
| 10,794,004 B2 | 10/2020 | Manifold et al. | |
| 10,927,500 B2 | 2/2021 | Manifold et al. | |
| 10,933,577 B2 | 3/2021 | Manifold et al. | |
| 12,163,285 B2 | 12/2024 | Manifold et al. | |
| 2004/0126570 A1 | 7/2004 | Kramer et al. | |
| 2008/0245498 A1 * | 10/2008 | Ostendorf | D21F 11/006 162/358.2 |
| 2011/0139389 A1 | 6/2011 | Phan et al. | |
| 2011/0139390 A1 | 6/2011 | Phan et al. | |
| 2011/0265967 A1 | 11/2011 | Phan et al. | |
| 2012/0021171 A1 | 1/2012 | Riviere et al. | |
| 2013/0209749 A1 * | 8/2013 | Myangiro | D21H 27/02 428/174 |
| 2015/0247287 A1 | 9/2015 | Maladen et al. | |
| 2016/0053436 A1 * | 2/2016 | Morton | D21F 7/08 162/353 |
| 2018/0119347 A1 | 5/2018 | Brent, Jr. et al. | |
| 2018/0119348 A1 * | 5/2018 | Brent, Jr. | D03D 25/005 |
| 2023/0151544 A1 | 5/2023 | Brent, Jr. et al. | |
| 2023/0167606 A1 | 6/2023 | Seger et al. | |
| 2023/0332353 A1 * | 10/2023 | Levine | D06M 15/564 |
| 2024/0068163 A1 | 2/2024 | Manifold et al. | |

FOREIGN PATENT DOCUMENTS

| | | | | |
|---|---|---|---|---|
| JP | 2025514067 A * | 5/2025 | | D21H 27/02 |
| KR | 20250003606 A * | 1/2025 | | D06M 23/16 |
| TW | 202342288 A * | 11/2023 | | D06M 23/16 |
| WO | WO 2008/054686 A2 | 5/2008 | | |
| WO | WO 2014/001217 A1 | 1/2014 | | |
| WO | WO 2014/166984 A1 | 10/2014 | | |
| WO | WO 2016/179080 A1 | 11/2016 | | |
| WO | WO-2023204835 A1 * | 10/2023 | | D06M 15/333 |

OTHER PUBLICATIONS

International Search Report and Written Opinion prepared for International Application PCT/US2022/042192 by the European Patent Office acting as the International Searching Authority, mailed Jan. 20, 2023.

* cited by examiner

105

109  107  106

126

126

Fig. 11A         Fig. 11B         Fig. 11C         Fig. 11D
120              121              122              123
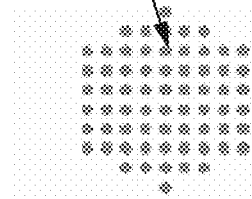 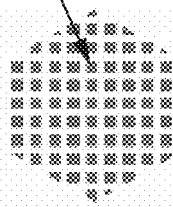 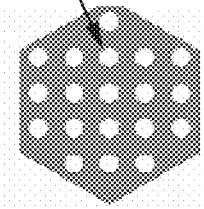 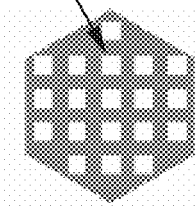
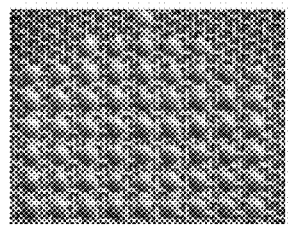 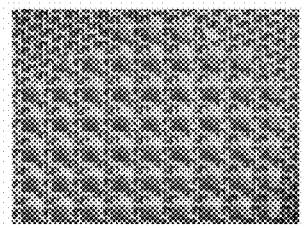 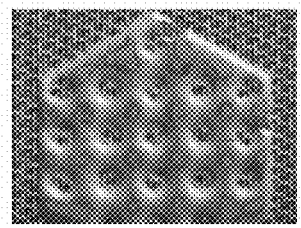 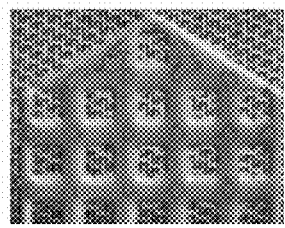
Fig. 12A
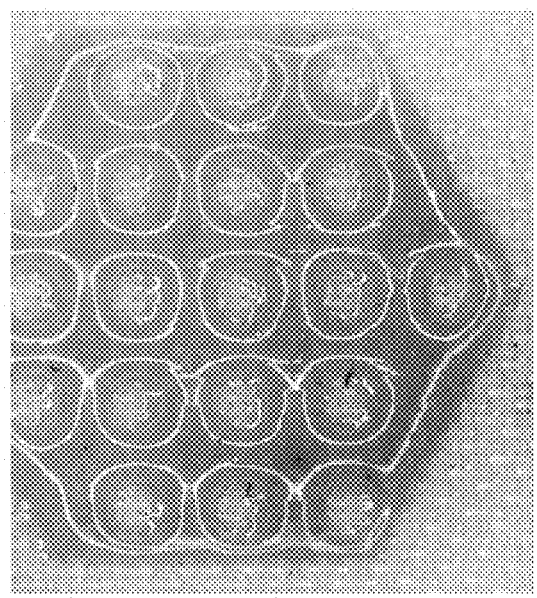

124 CRACKING

125 ABRASION FROM ROLL CONTACT

125 ABRASION FROM ROLL CONTACT

124 CRACKING

127 CRACKING

128 ABRASION FROM ROLL CONTACT

Fig. 16B
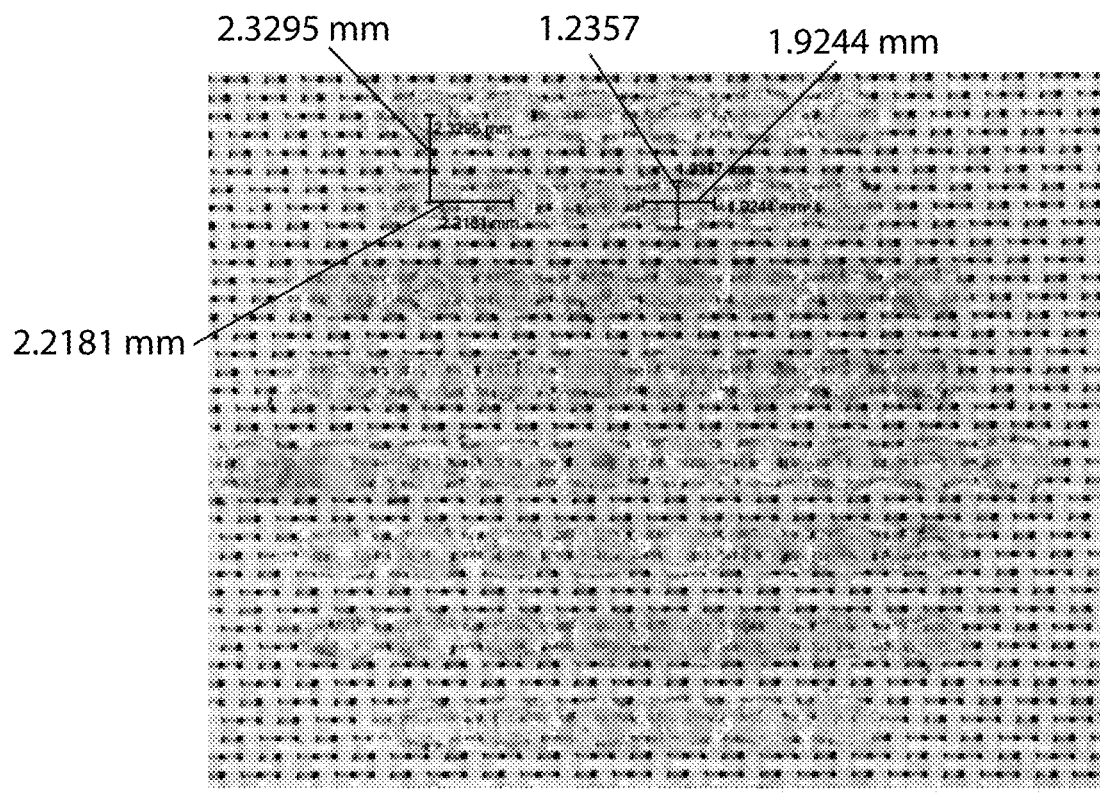
2.3295 mm  1.2357  1.9244 mm
2.2181 mm
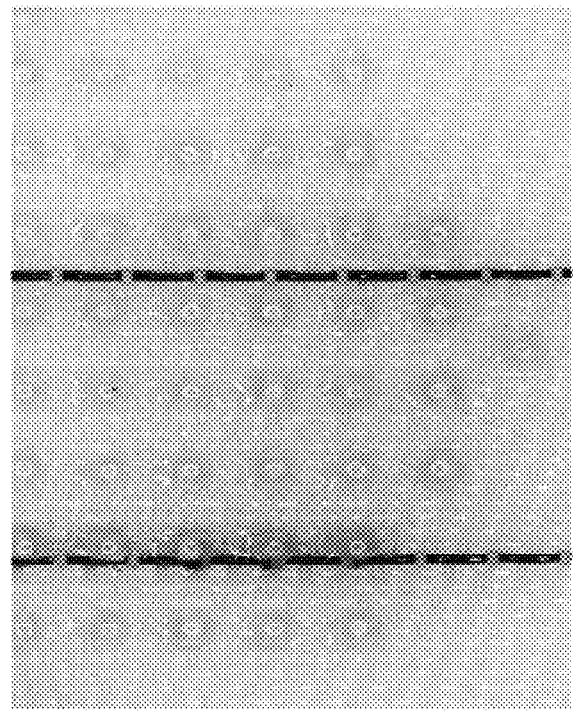
Fig. 17A

DISCRETIZED PATTERNED BELT FOR TISSUES, TOWELS, AND NONWOVENS

CROSS-REFERENCE TO RELATED APPLICATION

This application claims the benefit of priority of U.S. Provisional Patent Application Ser. No. 63/332,629 filed Apr. 19, 2022. The foregoing application is incorporated herein by reference in its entirety.

FIELD OF THE INVENTION

The invention relates to an industrial fabric, such as a texturing belt, used to create three-dimensional structures in a product produced thereon in the papermaking field, such as for fiber products, and in nonwoven processes.

BACKGROUND

Texturing belts are used to create three-dimensional products, e.g., sheet products such as sheets in paper, tissue, towel, and synthetic nonwoven processes. These texturing belts are typically employed in sections of processes where a variation in caliper of the belting can directly impart caliper, bulk, and three-dimensional patterning in the rolled goods produced. Construction of this type of texturing belt typically involves a base weave, such as a woven base structure, for dimensional stability and load bearing properties, and a top surface that is added to specifically impart texture, pattern, and bulk. The top surface material can be thermoplastic or thermoset in nature and can be directly applied in liquid resin form. Bonding can be chemical or thermal, or a combination of both.

In tissue and towel production, through-air-drying equipment utilizes patterned belting to develop a sheet product with bulk and softness, while simultaneously reducing material costs, and imparting recognizable patterns for branding purposes. Previous belting structures and process methods can impart: (i) simple patterns in a sheet product using discrete macro deposition and (ii) complex patterns in a sheet product utilizing film laminates to create continuous lattices on the surface of a belt.

However, problems exist with previous and existing technology. For example, there is a limit to pattern complexity of a film laminate. With a film laminate, one can only create continuous lattices because discrete portions of the pattern are removed to produce the pattern. Further, there is a limit to pattern complexity due to permeability loss of the belt. As complexity of a pattern increases, a significant portion of the belt surface is covered with additional material to create the pattern. The blocked open area on the base weave directly reduces air and water permeability. In rolled goods manufacturing, a loss of permeability typically leads to a reduction in water removal from the sheet and less control of the sheet during formation as vacuums are used to pull fibers into the textured surface and, in dry processes, to hold them in place prior to release. With a lower permeability, the two options available in producing the rolled goods are: (i) slow down the belt speeds to avoid turbulence and hold the sheet in place, which results in a loss of efficiency and higher cost of production and/or (ii) greatly increase the vacuum levels, which typically results in more fiber loss into and through the belt, increases wear on the machine side of the first layer, and increases energy costs.

Additionally, as complexity of the pattern increases, dimensional stability of the top surface becomes very important to maintaining a controlled impression on the sheet being manufactured. Elasticity of the top material is often required to survive the tension and compression forces present as the formed sheet travels through the forming portion of the manufacturing process. However, changes to thickness, width, and length of the top patterning surface, due to the required elasticity, create loss of control and variability in the pattern being formed.

Another problem with prior technology is that there is a limit to the structural integrity with an increased complexity of patterns. That is, problems of stress fracture (e.g., cracking), delamination, and durability exist. Generally, complex patterns typically require continuous lattices of various thicknesses, widths, and lengths to create the desired final attributes in the sheet product. Continuous sections of a top laminate or deposition result in stress concentrations at both the edges and body of the top surface material resulting in both delamination and stress cracking when the belt is repeatedly flexed. Either of delamination or stress cracking results in premature belt failure.

Problems also arise concerning durability. More specifically, trade-offs in material durability and abrasion resistance occur due to a need to accommodate heat, tension, and compression requirements as the belt runs through its process loop in producing a sheet product. Soft, flexible materials are generally less durable and less abrasion resistant than harder, more dimensionally stable materials.

SUMMARY OF THE INVENTION

The invention concerns an industrial fabric for producing a textured product. The industrial fabric has a first layer that has a length and a width and a second layer that covers at least a portion of a top surface of the first layer. The second layer comprises two or more non-adjoining subunits deposited on the top surface of the first layer.

In some embodiments, the two or more non-adjoining subunits form a pattern element.

In other embodiments, the two or more non-adjoining subunits each have a three-dimensional shape.

In yet other embodiments, the first and second layers of the industrial fabric are bonded together chemically, thermally, or mechanically.

In some embodiments, the pattern element forms a complex pattern.

In certain embodiments, the first layer is a woven fabric, nonwoven, laminate, or composite.

In yet other embodiments, the first layer is a nonwoven selected from machine direction yarn arrays, cross-machine direction yarn arrays, braids, a series of independent rings, spiral linked fabrics, extruded meshes, knitted structures, foils, films, spunbond fabrics, carded fiber, needled fiber, airlaid fiber, melt blown fiber, and/or wetlaid fiber structures.

In some embodiments, the non-adjoining subunits of the industrial fabric comprise an engineered polymer, a thermoplastic, a thermoplastic polyurethane, a polyamide, a polyester, a co-polyester, an ethylene-vinyl acetate (EVA), a thermoset, and/or combinations thereof. In select embodiments, the thermoset is a catalyzed, moisture cured, thermal-activated, or photo-activated polymer system. In further embodiments, the thermoset is a catalyzed, moisture cured, thermal-activated, or photo-activated polymer system of polyurethane, urethane acrylate, or silicone.

In certain embodiments, the permeability of the industrial fabric is increased about 10 to 90% compared to an industrial fabric with pattern elements that are continuous.

In other embodiments, the non-adjoining subunits of the second layer of the industrial fabric extend over the entire length and/or width of the first layer.

In some embodiments, the top surface of the first layer is a top surface of a forming side of a base fabric.

In certain embodiments, the pattern element is selected from round shapes, polygonal shapes, lines, curves, letters, numbers, words, logos, trademarks, animals, plants, foods, people, terrains, and/or combinations thereof. In certain embodiments, the round shape is a circle or an oval. In yet other embodiments, the polygonal shape is selected from triangles, squares, rectangles, pentagons, hexagons, heptagons, octagons, rhombi, diamonds, and/or stars.

In some embodiments, the three-dimensional shape of the non-adjoining subunits is selected from cubes, columns, pyramids, cones, prisms, spheres, ellipsoids, tetrahedrons, and/or combinations thereof. In other embodiments, the column shape is round or rectangular.

In certain embodiments, the industrial fabric is a texturing belt or processing belt.

In some embodiments, inter-subunit spacing of the non-adjoining subunits of the pattern element minimizes substantial fiber penetration of the textured product into areas between the non-adjoining subunits of the pattern element. In yet other embodiments, fibers of the textured product bridge the non-adjoining subunits of the pattern element.

In certain embodiments, the non-adjoining subunits do not act as a stressed member of the industrial fabric. In some embodiments, the industrial fabric reduces stress in the second layer. In certain embodiments, the industrial fabric reduces cracking and/or delamination in the second layer. In yet other embodiments, the industrial fabric reduces one or more of bending, flex fatigue, or compressive stress in the second layer.

In some embodiments, one or more of the non-adjoining subunits of the second layer are in-plane with the first layer.

In certain embodiments, the industrial fabric comprises a third or more layers. In some embodiments, the third or more layers is selected from woven fabrics, nonwovens, laminates, and/or composites. In other embodiments, the third or more layers is a nonwoven selected from machine direction yarn arrays, cross-machine direction yarn arrays, braids, a series of independent rings, spiral linked fabrics, extruded meshes, knitted structures, foils, films, spunbond fabrics, carded fiber, needled fiber, airlaid fiber, melt blown fiber, and/or wetlaid fiber structures.

In some embodiments, the industrial fabric comprises a third layer that is a base fabric and the first layer covers at least a portion of a top surface of the third layer.

In certain embodiments, the first layer of the industrial fabric is selected from spunbond fabrics, carded fiber, needled fiber, airlaid fiber, melt blown fiber, and/or wetlaid fiber structures.

In yet other embodiments, the industrial fabric comprises a third layer that is a base fabric, and the first layer is a layer of batt fiber covering at least a portion of a top surface of the third layer. In select embodiments, the batt fiber of the first layer is attached to the third layer by needling.

The invention further concerns a method of producing a textured product by texturing a product with an industrial fabric where the industrial fabric comprises a first layer having a length and a width and a second layer covering at least a portion of a top surface of the first layer. The second layer comprises two or more non-adjoining subunits deposited on the top surface of the first layer. In some embodiments, the two or more non-adjoining subunits each having a three-dimensional shape. In some embodiments, the non-adjoining subunits of the second layer of the industrial fabric do not act as a stressed member of the fabric.

In some embodiments, the industrial fabric used in the method comprises two or more non-adjoining subunits that form a pattern element. In certain embodiments, the pattern element is selected from round shapes, polygonal shapes, lines, curves, letters, numbers, words, logos, trademarks, animals, plants, foods, people, terrains, and/or combinations thereof. In yet other embodiments, the pattern element forms a complex pattern.

In other embodiments, the permeability of the industrial fabric used in the method is increased about 10 to 90% compared to a fabric with pattern elements that are continuous.

BRIEF DESCRIPTION OF THE DRAWINGS

FIG. 1A illustrates a standard, continuous deposition on a belt and FIGS. 1B and 1C show deposition of non-adjoining subunits on a belt according to embodiments of the invention.

FIG. 2 illustrates how non-adjoining subunits can create both pattern elements on one scale and an overall pattern on a larger scale.

FIG. 9A shows a resultant sheet product, FIG. 9C shows a 3D height map of a resultant sheet product.

FIG. 11A shows a discretized hexagon shape (a pattern element) with round subunits. FIG. 11B shows a discretized hexagon shape (a pattern element) with square subunits. FIG. 11C shows a solid hexagon shape (a pattern element) with round holes or voids. FIG. 11D shows a solid hexagon shape (a pattern element) with square holes or voids.

FIG. 12A shows a belt with solid hexagonal shape (a pattern element) with round holes before being subjected to a flex test.

FIG. 16B shows a belt with a discretized hexagonal shape (pattern element) with close spacing round subunits after flex testing.

FIG. 17A shows a belt with a discretized hexagonal shape (a pattern element) with coarse spacing round subunits before being subjected to flex testing.

FIGS. 18A-18F depict continuous hexagon pattern elements (solid lines outlining an open hexagonal space) that combine to form a lattice pattern on the belt that contains hexagonal-shaped voids in a continuous lattice.

FIGS. 19A-19G depict a discretized hexagonal-shaped pattern element on the belt.

FIGS. 20A-20E depict a continuous (solid) hexagon pattern element on the belt.

DETAILED DESCRIPTION OF THE INVENTION

Figure 1A:
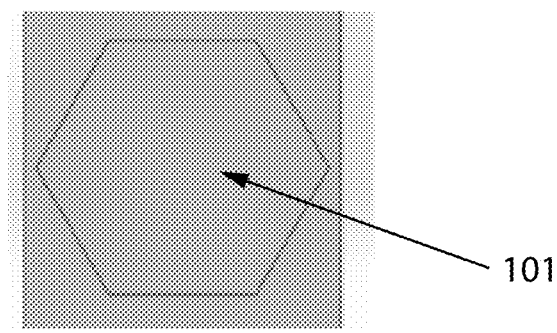
FIGS. 1A, 1B, and 1C illustrate an example of the general discretization strategy of the instant invention where

The terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

The term "yarn" or "yarns" in the following disclosure can refer to monofilaments, multifilament yarns, twisted yarns, textured yarns, coated yarns, bicomponent yarns, as well as yarns made from stretch broken fibers of any materials known to those ordinarily skilled in the art. Yarns can be made of carbon, polyamide, rayon, fiberglass, cotton, ceramic, aramid, polyester, metal, polyethylene, polypropylene, and/or other materials that exhibit desired physical, thermal, chemical or other properties. Further examples of suitable materials include, e.g., polycyclohexylenedimethylene terephthalate (PCT), cyclohexanedimethanol terephthalic acid (PCTA), polyphenylene sulfide (PPS), polyether ether ketone (PEEK), polyetherketoneketone (PEKK), polyethylene terephthalate (PET), and polyethylene naphthalate (PEN). Generally, any yarns of a base layer, such as a first layer of an industrial fabric of the invention, may be made from any commercially available material that is compatible, or can be made compatible, for bonding to a discretized second (e.g., topmost) layer.

A "pattern element" as used in the following disclosure refers to a deposit of material, such as a resin, in a desired shape or design. The pattern element is typically macro-sized (e.g., diameter greater than 1 mm). A pattern element may be comprised of a continuous deposition of material, or discretized subunit depositions of material.

Unless context indicates otherwise, a "subunit" as used in the following disclosure refers to a micro-sized (e.g., diameter less than 1 mm) deposit of material (e.g., a resin), two or more of which may make up a pattern element.

Unless context indicates otherwise, a "pattern" as used in the following disclosure refers to two or more pattern elements.

The terms "machine direction" (MD) and "cross-machine direction" (CD) as used in the following disclosure are used in accordance with their well-understood meaning in the art. That is, the MD of an industrial fabric, such as a belt, refers to the direction that the industrial fabric moves in a manufacturing process, such as a tissue/towel or nonwovens making process, while CD refers to a direction perpendicular to the MD of the industrial fabric.

The instant invention concerns an industrial fabric, such as a belt, for producing a textured product, such as a textured nonwoven product. In certain embodiments, the textured product is made from natural or synthetic fibers, or some combination of both. In certain embodiments, the instant invention relates to an industrial fabric, such as a belt, for creating a three-dimensional structure in paper, tissue, towel, and/or nonwoven product manufacturing processes. The product (which may be in the form of a sheet) is formed against the belt, thus creating a textured product, e.g., a textured sheet product.

The instant invention solves the problems in the art and provides solutions to the limitations of currently and prior-practiced belt technologies for, e.g., textured tissue and towel production. The instant invention relates to a texturing belt that can impart an endless variety of complex patterns utilizing discretization. With "discretization," individual subunits compose a pattern element, such as a specific shape (e.g., circle, square, hexagon) or design (e.g., company logo), and are not connected, and therefore do not act as a stressed member of an industrial fabric, such as a belt. Moreover, the invention solves, among other things, belt pattern complexity and flexibility independent of permeability and durability of the belt by achieving continuous patterns without a significant loss of permeability and reductions in processing speed for the end user of the belt. The advantages of the invention further include that belts can be produced that allow for differentiation of sheet product pattern and bulk and without sacrifices to sheet product processing efficiencies.

The industrial fabric of the invention comprises at least a first layer and a second layer. The second layer comprises, e.g., non-adjoining subunits. The second layer comprises a sheet-contact side, or forming side, surface that contacts a fiber-based product produced thereon. The first layer typically also comprises a sheet-contact side, or forming side, surface that contacts the fiber-based product produced thereon. In some embodiments, the first layer additionally comprises a machine-side surface. In other embodiments, the industrial fabric comprises more than a first and second layer, e.g., a third or more layers. In certain embodiments, the first layer may be a batting layer that is attached to the forming side of a third layer, with the non-adjoining subunits of the second layer being deposited on the batting layer. For example, the third layer may be a load bearing layer and comprise a machine-side surface of the fabric and both the first (batting) and second (non-adjoining subunit deposits) layers comprise a forming side surface of the fabric and contact a fiber-based product produced thereon.

The first layer in the industrial fabric may be woven or nonwoven. In embodiments where the first layer is a woven fabric, the woven fabric can be woven in various weave patterns, such as complex or simple, single or multi-layered, for example, a plain weave pattern or a satin weave pattern. The woven fabric may be woven from monofilament, plied monofilament, multifilament or plied multifilament yarns, and may be single-layered, multi-layered, or laminated. Yarns for the woven fabric may be extruded from any one of several synthetic polymeric resins, such as polyamide and polyester resins, used for this purpose by those of ordinary skill in the machine clothing arts.

In other embodiments, the first layer in the industrial fabric is a nonwoven, e.g., a permeable nonwoven. In particular embodiments, the nonwoven is selected from extruded meshes, knitted structures, MD and/or CD yarn arrays, braids, a series of independent rings, spiral linked fabrics, or other nonwoven products such as foils, films, spunbonds, or carded, airlaid, melt blown, or wetlaid materials.

The second layer comprises subunits that make up a discretized pattern. The discretized pattern subunits can comprise any suitable material. Examples of suitable materials include engineered polymers, thermoplastics, thermoplastic polyurethane, polyamides, polyesters, co-polyesters, ethylene-vinyl acetate (EVA), and thermosets, including catalyzed, moisture-cured, thermal or photo-activated polymer systems of polyurethane, urethane acrylates, or silicones, to name a few examples, and combinations thereof.

A texturing belt with discretization of the invention leads to greater longevity of the second layer, which is a discretized layer, in bending, flex fatigue, and normal tensile/compressive stress, as areas of high stress concentration in the second layer are avoided. Thus, a technical advantage of the invention is the reduction of stress on the material of the second layer that is on a top surface of an industrial fabric of the invention. In some embodiments, an industrial fabric of the invention reduces any critical stress in the second layer, which is the discretized layer, that results in cracking as a function of, e.g., material, flex angle, speed, and/or temperature to which the fabric is subjected.

Figure 8:
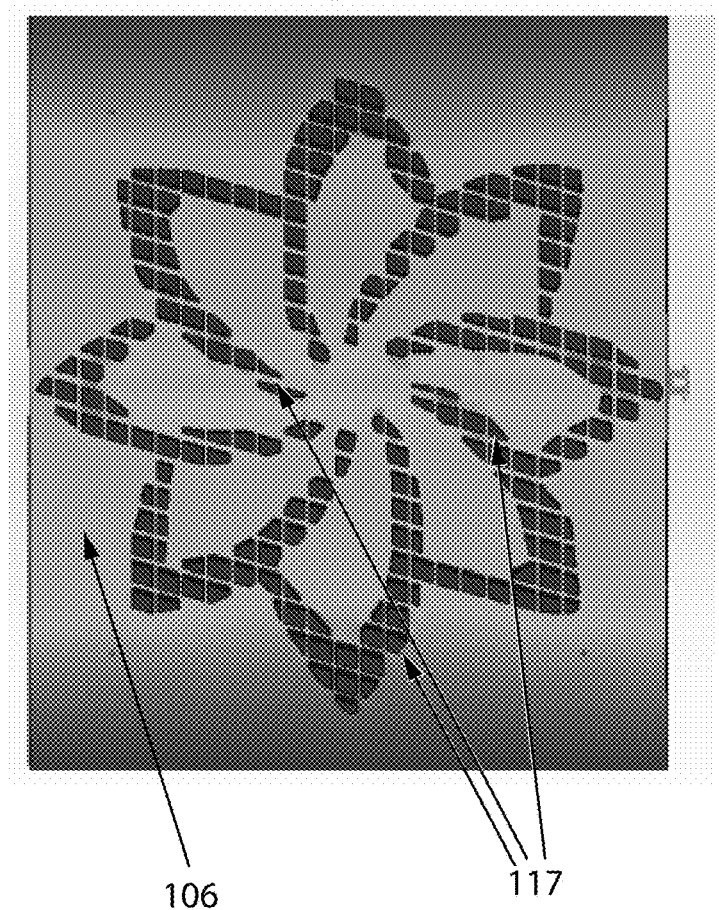
FIG. 8 is an enlarged view (2D view) of FIG. 7B from the top-down.

The discretized pattern element subunits are typically deposited onto a first layer comprising a length and a width, such as a nonwoven or woven fabric substrate, using a deposition nozzle. In some embodiments, the subunits can be deposited at droplet sizes approaching 1 mm, while in other embodiments deposits can be aggregates of, e.g., 20 pl (picoliter) droplets, e.g., to form larger pattern elements. In other embodiments, the subunits can be deposited at a temperature of 30° C., including a range of 0° C. to 350° C. The subunits can be deposited in any shape, e.g., by aggregating smaller units to create sharp renderings, e.g., shapes with angled edges and/or clean lines. For example, FIG. 8 depicts diamond- and triangle-shaped subunits that result in clear edges as two petals converge in the complex flower pattern element, rendering the two petals distinct, which would not be the case with deposits that are amorphous or unstructured.

Physically, the resulting dimensional proportion of the subunits is not limited to any particular three-dimensional shape. The subunits may be any suitable shape, including three-dimensional shapes such as, e.g., a column, cube, cylinder, pyramid, cone, cuboid, sphere, prism, a half-sphere, etc. The subunits may be deposited on any suitable first layer, such as a base structure that is a woven belt, a nonwoven belt, or a composite. The subunits will often have a depth, though no minimum depth is required. The aspect ratio of subunit height to width and length can be modified to meet specific design requirements and may often determine the stress loading in the structure (especially the discretized pattern elements) based upon several factors, such as sheet bulk and caliper. Additionally, the subunit shapes of the second (e.g., topmost) layer of an industrial fabric of the invention can be uniform or can be a mix of shapes. For example, some subunits may be pyramidal while others on a same belt may be cylindrical.

Individual non-adjoining subunits of a second layer (e.g., topmost forming side layer) of an industrial fabric of the invention may collectively constitute a discretized pattern element. A pattern element in discretized form is a solid pattern element that is subdivided into component non-adjoining subunits that together make up or mimic the solid pattern element, e.g., in a sheet product produced thereon. A pattern element, whether solid or discretized, is a constituent of an overall pattern that the second layer comprises for texturizing a product, such as a fiber-based product, produced thereon.

In certain embodiments, the overall pattern comprises two or more pattern elements (e.g., two or more squares). In other embodiments, the overall pattern comprises a singular pattern element (e.g., a square) that is repeated throughout the second layer (e.g., topmost forming side layer) of the industrial fabric (and thus, throughout a fiber-based product produced thereon). In certain embodiments, the pattern element is uniformly repeated. For example, a repeated square pattern element may result in an overall pattern that is a grid. In other embodiments, the pattern element is randomly repeated. In yet other embodiments, the pattern element is uniformly repeated in portions of the second layer and randomly repeated in other portions of the second layer of the industrial fabric. In some embodiments, the overall pattern comprises multiple pattern elements. In certain embodiments, the pattern elements are the same shape but of varying size. For example, in some embodiments the pattern elements are large squares and small squares. In other embodiments, the pattern elements are different. For example, in some embodiments, the pattern elements are squares and circles of the same or varying size. In yet other embodiments, the pattern elements are a mixture of different pattern elements that are uniformly repeated and/or randomly repeated. In some embodiments, the pattern elements are a mixture of different pattern elements that do not repeat.

Pattern elements may be any desired shape or design. Pattern elements may be round or angular or any combination of both. Examples of pattern elements include round shapes such as circles and ovals, and polygonal shapes such as triangles, squares, rectangles, pentagons, hexagons, heptagons, octagons, *rhombi*, diamonds, and stars. Pattern elements may also be lines, curves, letters, numbers, words, logos, trademarks, animals, plants, foods, people, terrains, and/or combinations thereof.

The topmost surface layer (e.g., a forming side surface layer) of an industrial fabric, such as a texturing belt, of the invention comprises one or more pattern elements in discretized form. The pattern element is typically created in discretized form by the deposition of two or more non-adjoining subunits on a base structure, such as a first layer that is a woven fabric.

The optimum size, shape, and distribution of the subunits can depend on, e.g., the size of the overall deposition, the translatable intricacies of the desired pattern, and the deposition materials. For example, some parameters that may affect the subunit sizes and shapes in the second layer include (i) the deposition technology (e.g., nozzle spacing, print resolution), (ii) the subunit material physical interaction with the first layer, such as a base layer (e.g., "wetting out" of deposited material), (iii) the first layer, such as a base layer, structure influence on pattern development (e.g., monofilament size and mesh/count/open area in woven structures and monoplanar properties in continuous structures), and (iv) the interaction of the deposition with the final fiber-based (e.g., sheet) product (e.g., fiber length, basis weight, and/or sheet tensile properties on the ability of the deposition to functionally make a pattern/impression in the sheet).

A pattern element of a surface layer (e.g., forming side surface layer) of an industrial fabric of the invention may comprise two or more non-adjoining subunits that together make up the pattern element in discretized form. The discretized form of the pattern element results in the same or substantially the same pattern element in solid form in a product, such as a fiber-based product, produced thereon. For example, a pattern element that is a hexagon may comprise a series of resin deposits of columnar non-adjoining subunits that collectively make up a hexagon pattern in discretized form. In this embodiment, the discretized hexagon pattern element produces or mimics a solid hexagon shape in a fiber-based product produced thereon.

The spacing between discrete, non-adjoining subunits of a discretized pattern element is inter-subunit spacing. Often, the minimum degree of spacing between the subunits depends, in part, upon the first layer, e.g., the substrate or base fabric the subunits are deposited upon. For example, in certain embodiments, with a first layer that is a woven substrate, a minimum spacing between subunits of the second layer may be, e.g., 1-2 yarn diameters (essentially irrespective of the mesh/count of the woven substrate) to prevent the material of the subunits from flowing together. In other embodiments, for example, for a monoplane continuous sheet product, the subunits of the second layer may be closer together. Typically, the inter-subunit spacing is wide enough to allow water to pass through. In some embodiments, the subunits may be spaced far apart without any particular limit, so long as the interaction with the fibers that form the fiber-based (e.g., sheet) product results in satisfaction of the desired macro pattern in the sheet product produced.

In further embodiments, fibers of a fiber-based product (e.g., a sheet product) produced on an industrial fabric, such as a texturing belt, of the invention do not significantly press or extend substantially into the inter-subunit spacing of a discretized pattern element. Rather, in certain embodiments, the product fibers (e.g., sheet product fibers) bridge the area between the non-adjoining subunits of the discretized pattern element.

The deposited subunits form a deposition structure atop the first layer of an industrial fabric of the invention. The subunits can be, e.g., resin deposited on the first layer and subsequently cured, e.g., photocurable. The deposition structure of the second (e.g., topmost) layer can form a top patterning surface, such as a complex patterning surface, on, e.g., the forming side of a texturing belt. Examples of complex patterns include, e.g., logos, images, and repeatable pattern elements with a large number of subunits. A complex pattern can be a pattern of potentially varying elements that do not necessarily repeat geometrically. By contrast, a simple pattern may be a geometrically X×Y repeating pattern of identical common elements (e.g., checkerboard dots).

In some embodiments, one or more portions of an industrial fabric of the invention comprises discretized pattern elements and one or more portions of the same fabric comprises a continuous deposition, e.g., a solid line of resin.

The deposited subunits of the second (e.g., topmost) layer can form a discrete layer in relationship to the first layer (e.g., woven base fabric), or one or more portions of the deposited subunits of the second layer can impregnate the first layer. While the second layer deposition can have a height above the top plane of a first layer of a fabric of the invention, no minimum height is required. Rather, the subunit deposition of the second layer, irrespective of height, is typically designed to create a blockage in the first layer (e.g., base layer) that impedes permeability and contributes to a resultant fiber-based (e.g., sheet) product's pattern. For example, in certain embodiments, the first layer is a non-woven fabric, and the subunit deposition of the second layer is in-plane with the first layer nonwoven fabric while creating a pattern in a sheet product produced thereon.

By employing discretization as described herein, the deposition structure of the second layer is partially decoupled from the macro effects of bending and tensile forces in the first layer, thereby allowing the first layer to continue to bear the majority of the total stress applied to the industrial fabric (e.g., a belt) for greater longevity of the deposition structure of the second layer. Discretization as utilized in the second (e.g., topmost) layer of an industrial fabric of the invention also provides opportunities to use deposition materials with different tensile, and bending properties (e.g., different tensile strength, hardness, and/or modulus) than that of the first layer.

As a result of the discretization, a discretized patterned industrial fabric, such as a texturing belt, of the invention exhibits many benefits, such as fewer limitations to pattern complexity, less loss of air permeability, and less impact on structural integrity of the industrial fabric. By way of example, permeability of a discretized pattern element can be 50% more permeable versus a continuous (solid) pattern element on the same substrate (e.g., a base fabric such as a woven or nonwoven fabric) and still form a high bulk, texturized sheet of paper. The permeability of a discretized pattern element may depend on factors such as the physical open area of the base fabric, the area of the deposited subunits of the pattern element, and/or the interaction of the pattern element and the void volume of the base fabric. In some embodiments, the air permeability may be scaled directly with the percent of deposited area of the subunits per unit area.

Additionally, control of the surface pattern of the industrial fabric is generally achieved by largely decoupling the physical properties of the second layer surface materials from the dimensional stresses at the surface of the industrial fabric. Moreover, stress concentrations are largely transferred to a load bearing base structure, such as a first layer that is a woven fabric, thereby greatly reducing the tendency for stress fractures or delamination of the second layer subunits of discretized pattern elements (e.g., top patterning surface) of an industrial fabric of the invention. Additionally, durability and abrasion resistance of the second layer (e.g., top patterning surface) can be optimized without the constraints of high elasticity and compression required for continuous matrices. Accordingly, in some embodiments, harder and more dimensionally stable materials can be used to create the non-adjoining subunits of the topmost layer of an industrial fabric of the invention.

Figure 1B:
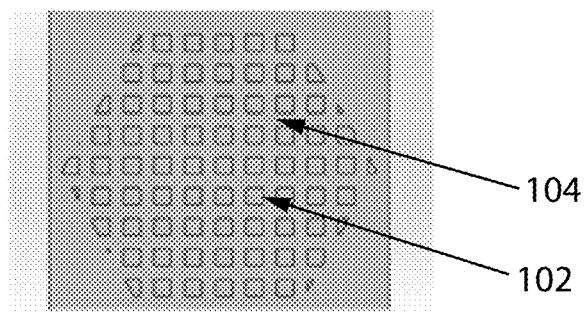
Figure 1C:
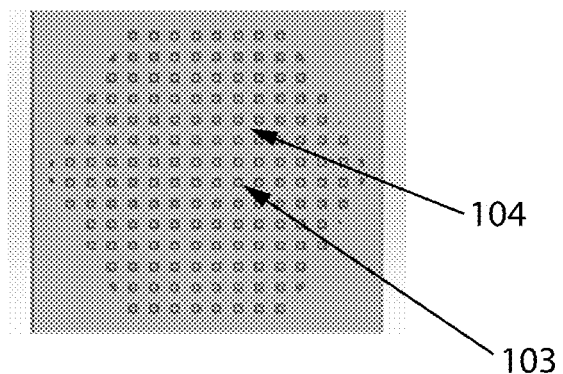

FIGS. 1A-1C show an example of the general element discretization strategy of the instant invention. FIG. 1A shows a larger, individual solid pattern element (101). Using discretization, the pattern element can be subdivided to create discrete, non-adjoining subunits that emulate the solid pattern (101). The discrete subunits' dimensions can be varied to result in a range of sizes from coarse to fine, while still comprising the overall shape of the individual pattern element. For example, FIG. 1B shows subunits (102) that are larger than subunits (103) in FIG. 1C, but each of the subunits of FIGS. 1B (102) and 1C (103) form the overall shape of the individual hexagon pattern element of FIG. 1A (101). The spacing between the discrete, non-adjoining subunits in each of FIGS. 1B and 1C is inter-subunit spacing (104) as it is spacing between non-adjoining subunits.

FIG. 1A illustrates a solid pattern element with a basic size of 4 mm (area of 14.5 mm$^2$). FIG. 1B illustrates a discretized pattern element with subunits of 0.3 mm per side, which are individually 0.62% of the total pattern element area. And FIG. 1C illustrates a discretized pattern element with subunits of 0.15 mm per side, which are individually 0.15% of the total pattern element area. Additionally, the subunits and inter-subunit spacing—that is, the spacing between any two individual subunits—do not need to be of uniform size, height, distribution, or material to create a surface layer of an industrial fabric, such as a belt, of the instant invention. The dimensions of the deposited subunits and the inter-subunit spacing can result from e.g., the size of a deposition nozzle, the properties of the deposited material, and/or the construction (e.g., weaving pattern or material composition) of the one or more layers underlying the surface layer comprising the subunits.

Figure 2:
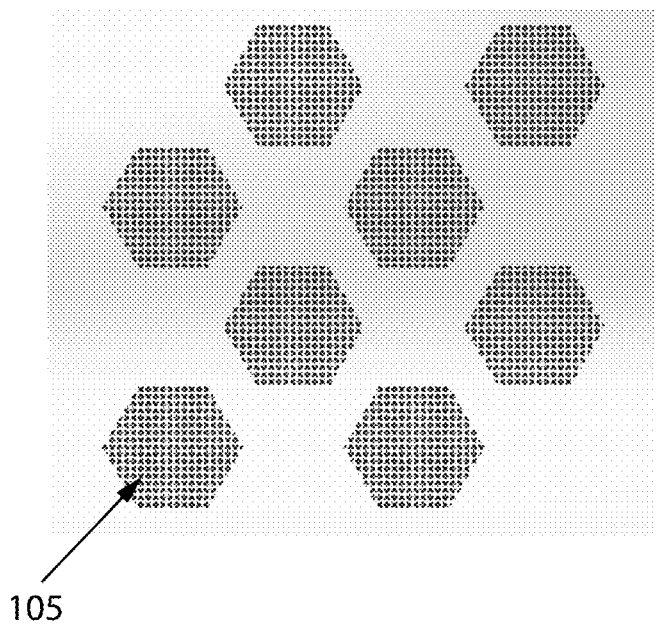
FIG. 2 illustrates multiple pattern elements of FIG. 1B or 1C on a belt to create a pattern. The pattern in FIG. 2 represents a total area of 40 mm×40 mm, with 300 um discretized subunits that make up the pattern element.

FIG. 2 depicts a pattern comprising discretized pattern elements similar to those of FIGS. 1B and 1C. In FIG. 2, each pattern element (105) has a basic size of 15 mm (97 mm$^2$ area). The subunits are 0.3 mm each, thereby each resulting in 0.092% of the total pattern element area.

FIGS. 3A and 3B and FIGS. 4A and 4B show the stress distribution in a bending stress analysis simulation where the subject (107, 108) is a second layer comprising a single individual pattern element joined to a first layer that is a flexible first layer (106). A stress analysis simulation serves the purpose of showing the stress distribution as a result of bending. Generally, in such a simulation, (i) the pattern element has a fixed boundary condition in the middle, under the bottom (machine side) of the first layer of the fabric structure (physically simulating bending around a roll) and (ii) a downward (product sheet side toward the machine side) displacement is applied to the first layer on the faces perpendicular to the machine direction. In this case, the displacement length applied is equal to 100% of the size (width) of the pattern element.

Figure 3A:
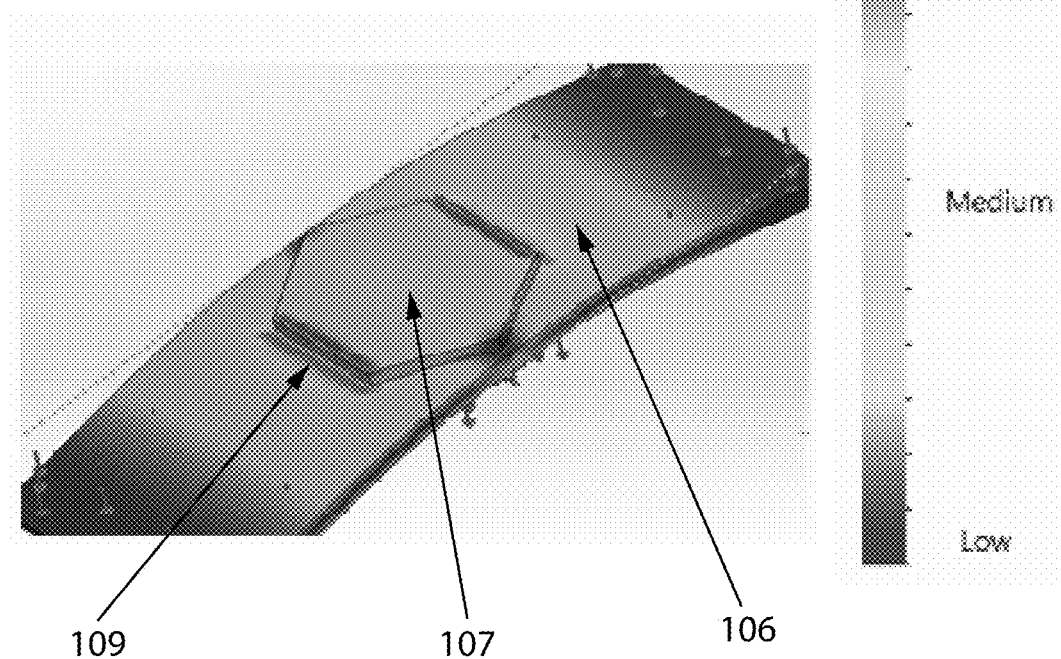
FIGS. 3A (a three-dimensional, or 3D, view) and 3B (a two-dimensional, or 2D, view) illustrate an example of Finite Element Analysis (FEA) stress bending of a belt with a standard, continuous deposition. The areas that are medium grey represent areas of high stress, areas that are light grey represent areas of medium stress, and areas that are dark grey or black represent areas of low stress as shown by the accompanying color-coded bar graph in FIG. 3A. The colored-coded bar graph is also applicable to FIGS. 3B and 4-8 discussed below.
Figure 4A:
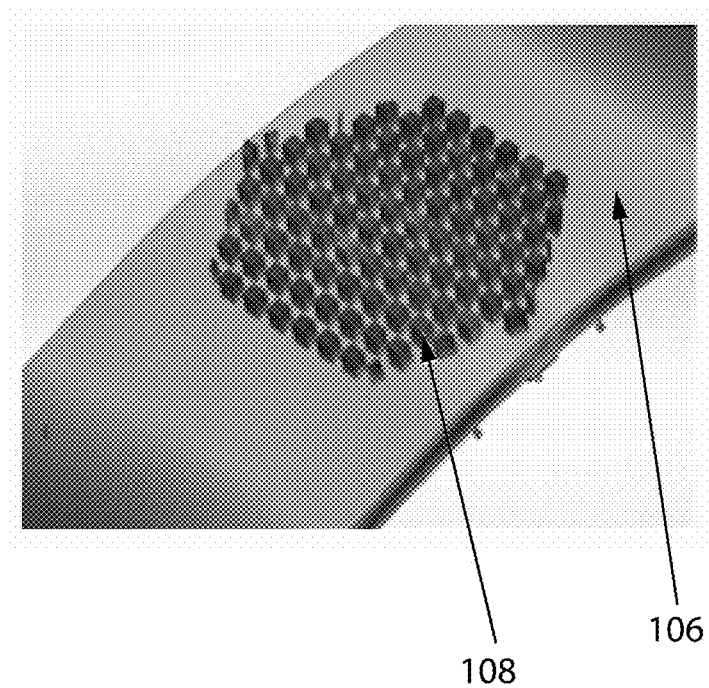
FIGS. 4A (3D view) and 4B (2D view) illustrate an example of FEA stress bending of a belt with deposition of non-adjoining subunits. The high and medium-stress areas are located in the first layer, or base structure, and not in the second layer that is comprised of the non-adjoining subunit depositions.

FIGS. 3A (3D View) and 3B (2D View) represent a second layer solid deposition structure pattern element (107), whereas FIGS. 4A (3D view) and 4B (2D view) represent a second layer pattern element of a discrete, non-adjoining subunit structure (of the instant invention) (108).

Figure 3B:
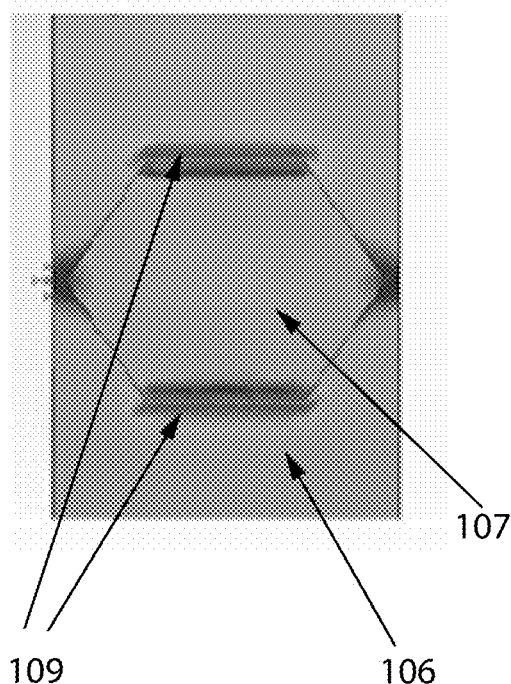

In FIGS. 3A and 3B there are large stress concentrations (109) at the outer edges of the solid deposition where it interfaces with the first layer and a medium uniform level of stress transfer throughout the whole deposition. This is further shown by the color-coded bar graph of FIG. 3A (medium grey as high stress, light grey as medium stress, and dark grey/black as low stress). In this case, failure includes delamination of the deposition at the areas of high stress concentration of the deposition-first layer interface. There also may be cracking of the deposition in the center, depending on the modulus of the material. Both of these failure modes, delamination and cracking, have been validated by bend testing, e.g., flex fatigue testing, of physical deposition samples. See, e.g., FIGS. 12 and 13.

Figure 4B:
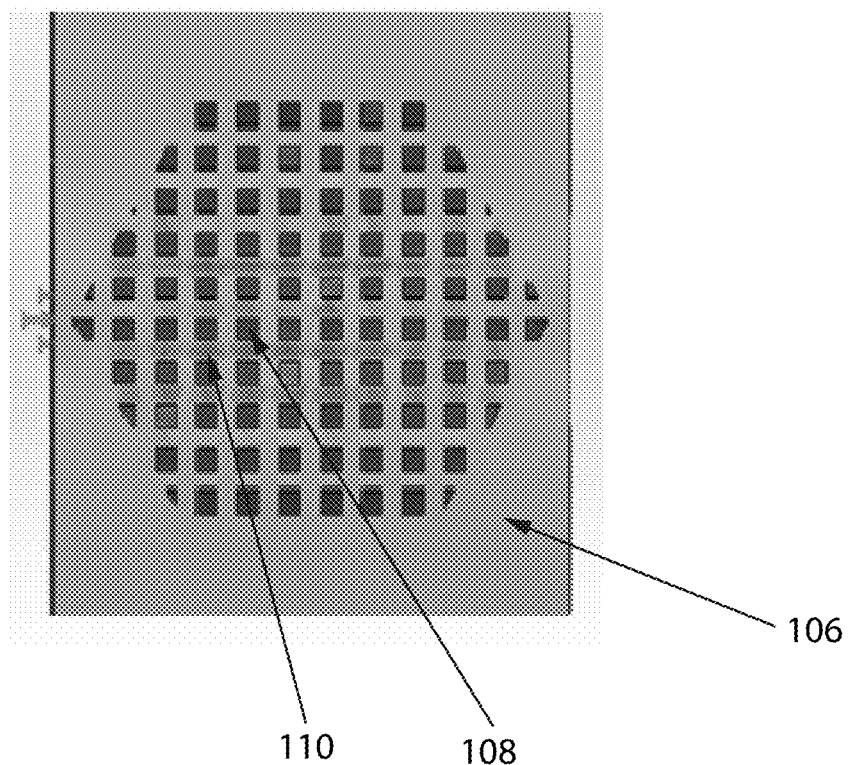

In FIGS. 4A and 4B, the second layer discretized pattern element deposition structure (subunits) carries much lower stresses than the solid deposition structure pattern element because the subunits are not connected with transferring the stress, which shifts the neutral axis of the bend area toward the first layer base fabric. There are high stresses (110) in the first layer base fabric between some of the individual subunits, and this may cause some local delamination of individual subunits depending on material modulus and the degree of bend. However, areas of high stress are minimized through the use of the individual discretized pattern element subunits, as demonstrated in FIGS. 4A and 4B.

The permeability of any one belt with discretization of the invention can depend on various factors, such as the pattern and pattern element size as well as the interaction with any void volume in the base layer upon which the discretized pattern element subunits are deposited. In the belt of FIG. 4, the permeability of the FIGS. 4A and 4B belt with the discretized pattern element is approximately 50% greater than the belt of FIGS. 3A and 3B with the solid pattern element.

The instant invention supports greater permeability of an industrial fabric, such as a texturing belt, compared to a prior-art texturing industrial fabric having a continuous deposition on the forming side (sheet side) surface, wherein the greater permeability of a fabric of the invention is in the range of about 10-90%, including, e.g., 15%, 20% 25%, 30%, 35%, 40%, 45%, 50%, 55%, 60%, 65%, 70%, 75%, 80%, and 85%, and fractions in between.

Figure 5A:
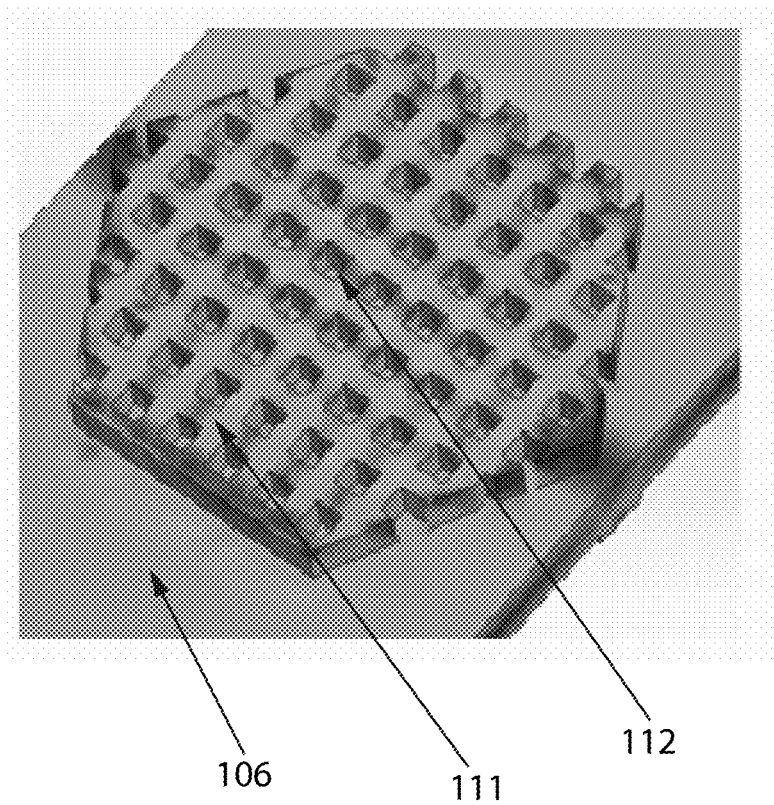
FIGS. 5A (3D view) and 5B (2D view) illustrate a belt with FEA of continuous lines of resin of the inverse pattern of that of FIGS. 4A and 4B and related FEA stress bending representing a lattice, e.g., holes in a continuous layer of resin. High stress areas are located at the surface of the second layer (the continuous lines of resin).
Figure 5B:
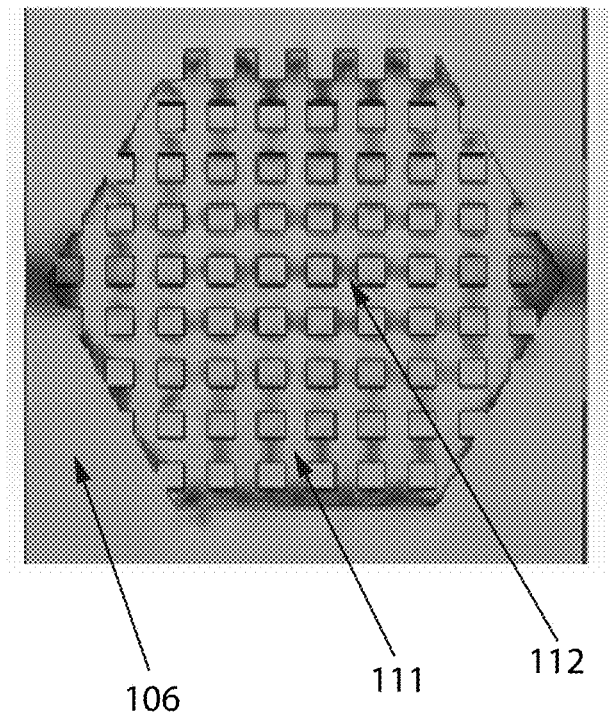

FIGS. 5A (3D view) and 5B (2D view) show the FEA of a pattern element (111) that is the inverse of the pattern element (108) shown in FIGS. 4A and 4B and the resulting bending stresses if bent in the same manner as done with the belts of FIGS. 3A and 3B and 4A and 4B. The inverse pattern element was created by a continuous deposition and shows a continuous lattice framework. A comparison of FIGS. 4A and 4B with FIGS. 5A and 5B demonstrates advantages of using discretization, e.g., in creating non-adjoining, discrete subunits as in FIGS. 4A and 4B that result in lower bending stresses (108) in the deposited second layer structure compared to the high bending stress concentrations (112) shown in the deposited second layer in FIGS. 5A and 5B. The stresses shown in FIG. 5 would likely cause localized cracking of the deposited structure and the failure of the deposition to adhere to the first layer base structure (106). Creating a connected lattice pattern in the manner of FIGS. 5A and 5B does not confer the functional benefits of the non-adjoining, discrete patterning methodology applied to an industrial fabric as exemplified by, e.g., FIGS. 4A and 4B.

FIGS. 6A and 6B and FIGS. 7A and 7B show a similar bending stress analysis as done using simulation of a solid deposition layer (FIGS. 6A and 7A) compared against that of the instant invention using discretization (FIGS. 6B and 7B), where the underlying deposition is of non-uniform shape.

For example, some subunits may be a round column shape while others may be three-dimensionally polygonal, such as cubical or rectangular columns, or a combination of round and angular three-dimensional shapes and have differing distribution. As another example, some subunits may be pyramidal in addition to conical that together form a logo of hexagon pattern elements and/or trademark lettering. Generally, discretized pattern element subunits can be created in any shape and size distribution. There is no limitation to standard geometric shapes for the subunits or uniform subunits. Moreover, the subunit size and shape can be randomized.

Figure 6A:
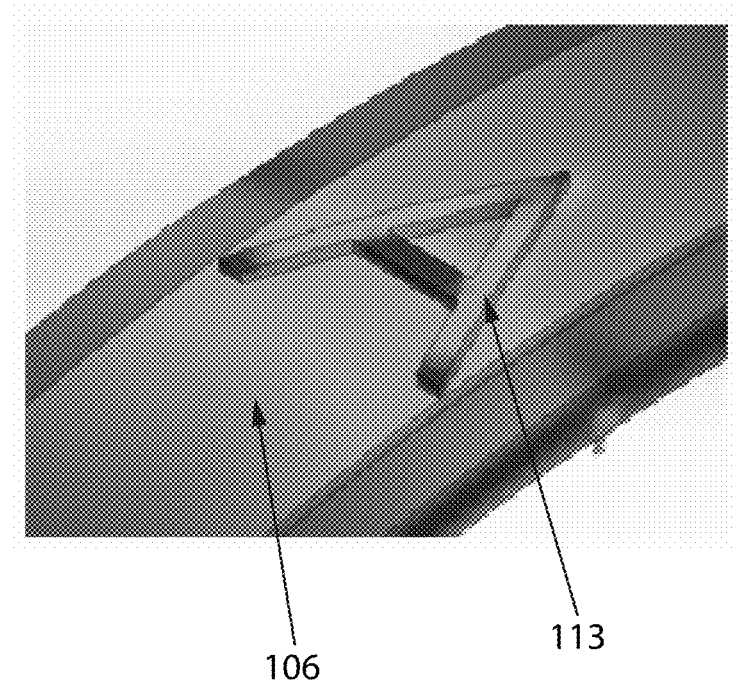
FIGS. 6A (3D view) and 6B (3D view) illustrate FEA stress bending of a standard, continuous deposition in a letter "A" shape (FIG. 6A) and FEA stress bending of a belt with deposition of non-adjoining subunits in a letter "A" shape (FIG. 6B), respectively. Higher stress areas of the standard continuous deposition of the letter "A" are located at the surface of the second layer. Higher stress areas of the belt with the deposition of non-adjoining subunits are located at the surface of the first layer.
Figure 6B:
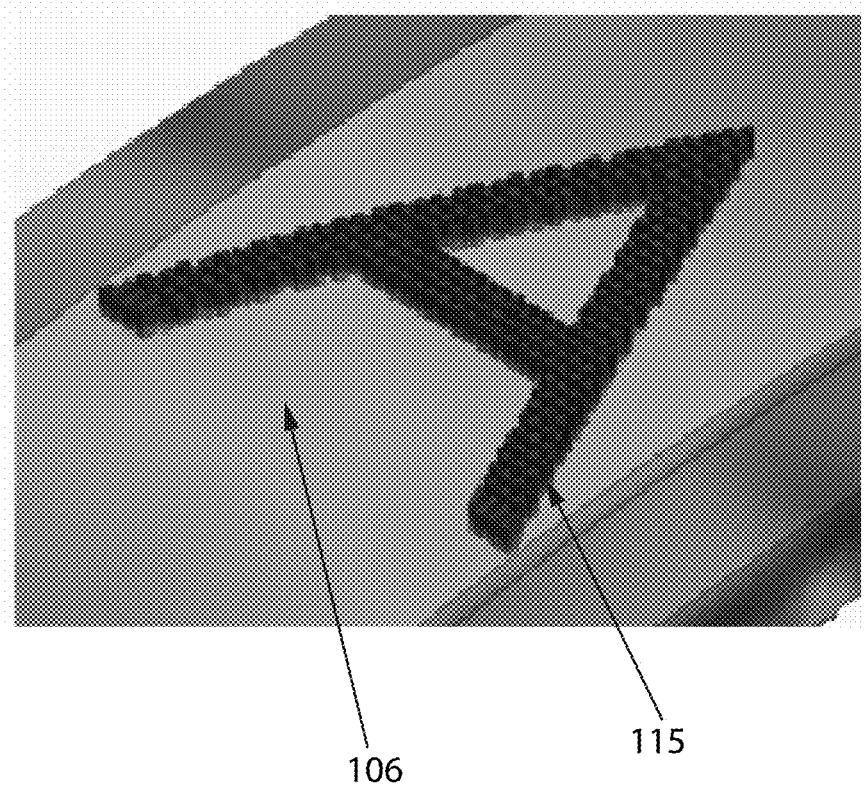
Figure 7A:
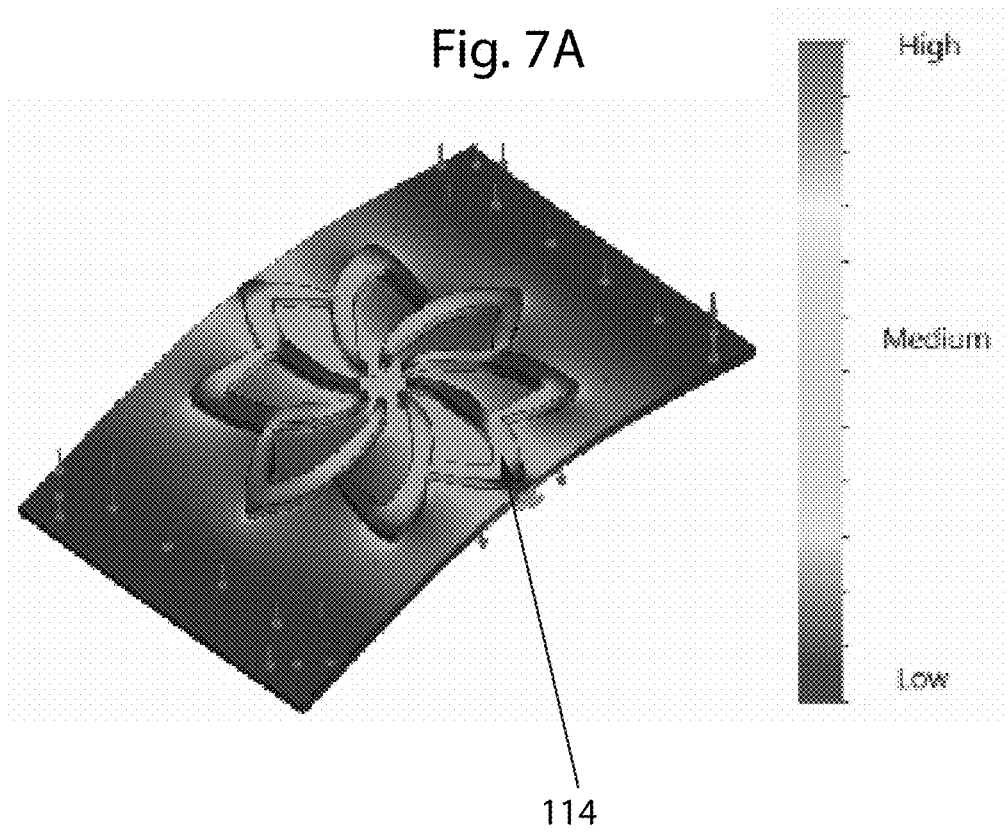
FIGS. 7A (3D view) and 7B (3D view) illustrate FEA stress bending of a standard, continuous deposition in a spiraled flower shape (FIG. 7A) and FEA stress bending of a belt with deposition of non-adjoining subunits in a spiraled flower shape (FIG. 7B), respectively.
Figure 7B:
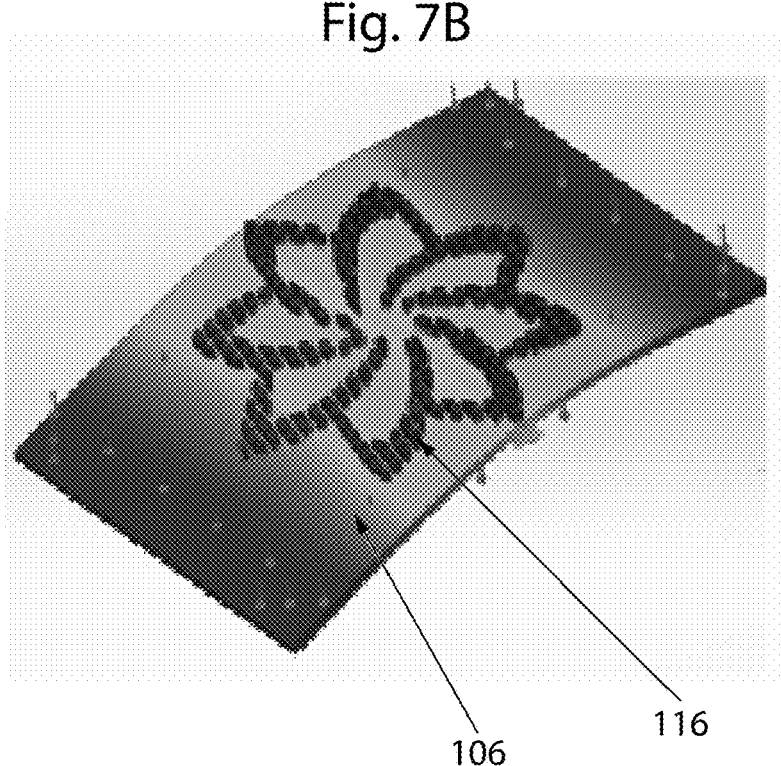

FIGS. 6A and 7A show conventional continuous deposition (113, 114, respectively), while FIGS. 6B and 7B show non-adjoining subunits (115, 116, respectively) of the instant invention. The pattern of FIGS. 6A and 6B is in the shape of the letter "A" and the pattern of FIGS. 7A and 7B is in the shape of a spiralized flower.

FIG. 8 shows a subdivision strategy whereby the discrete deposited subunits (117) are of varying size, shape, and distribution while still emulating the overall pattern element shape of a spiralized flower. FIG. 8 is an enlargement of FIG. 7B shown in a flat view.

Figure 9A:
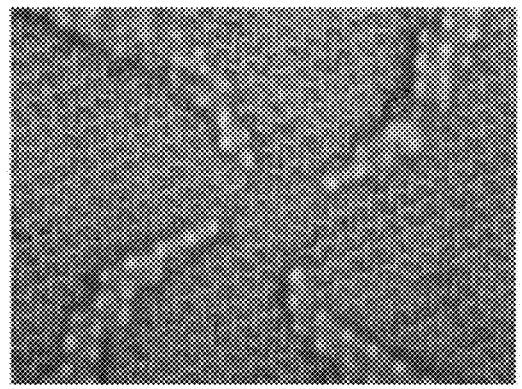
FIGS. 9A and 9C illustrate an exemplary sheet product produced on a belt of the invention having a patterned surface utilizing the general discretization strategy disclosed herein.
Figure 9B:
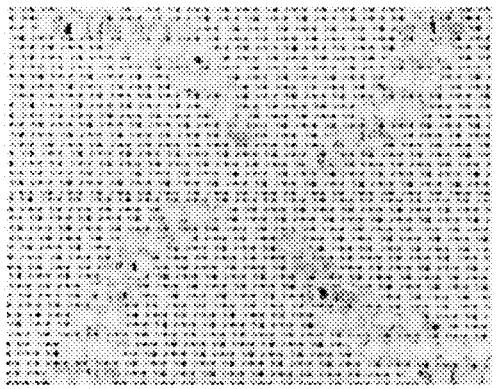
FIG. 9B shows the deposition structure used to make the resultant sheet product of FIG. 9A.
Figure 9C:
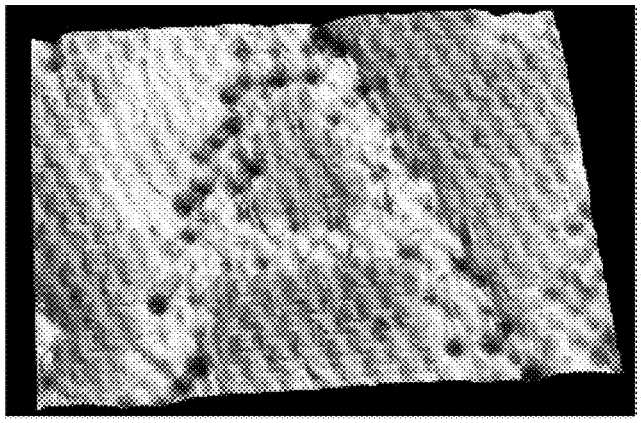
Figure 9D:
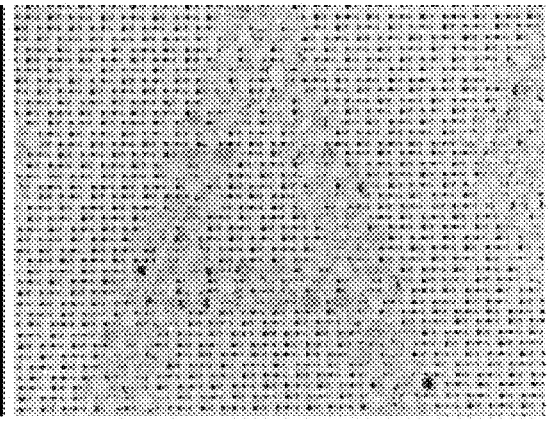
FIG. 9D shows the deposition structure used to make the resultant sheet product of FIG. 9C. Areas of light to medium grey in the color-coded height map of FIG. 9C indicate areas of higher elevation, and white and dark grey to black areas indicate areas of lower elevation. The color coding of the height map in FIG. 9C is also applicable to FIGS. 11-15 and 17.
Figure 10A:
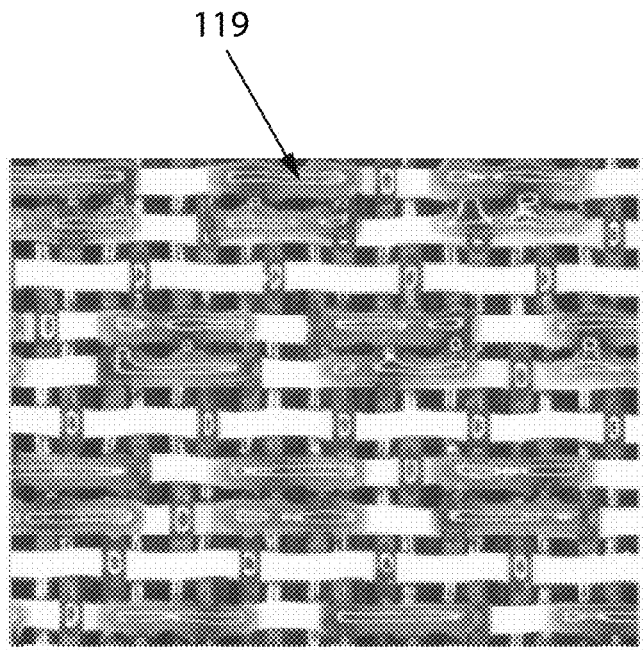
FIGS. 10A and 10B illustrate a discretization deposition resulting in increased belt permeability versus a belt having solid depositions in FIGS. 10C and 10D.
Figure 10B:
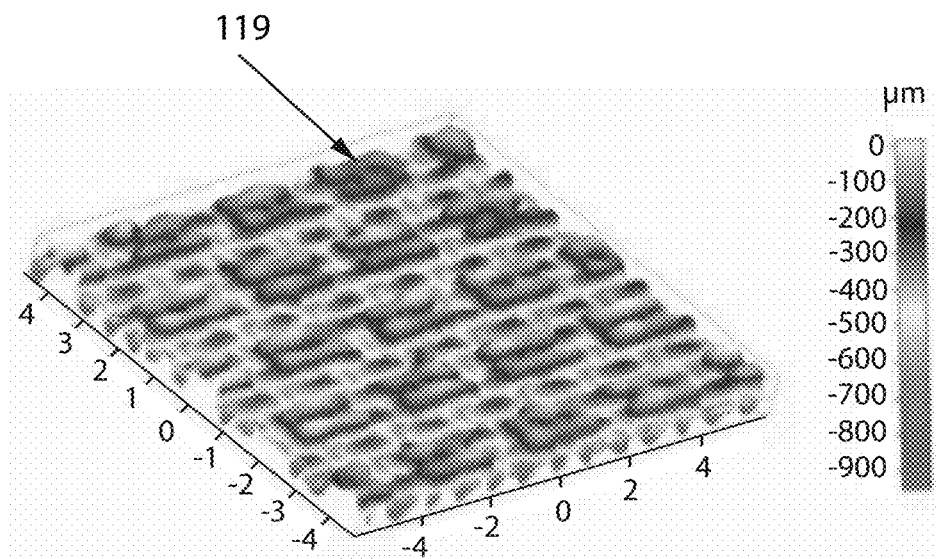
Figure 10C:
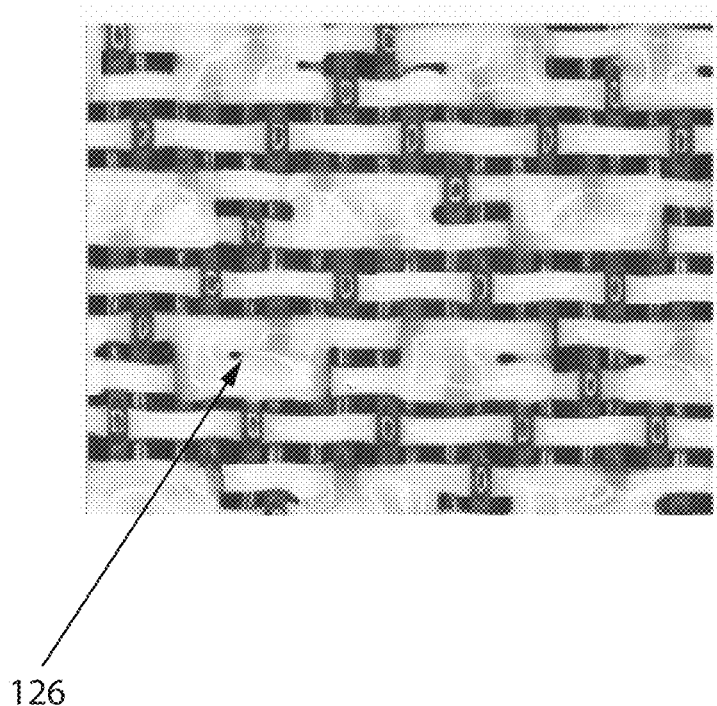
Figure 10D:
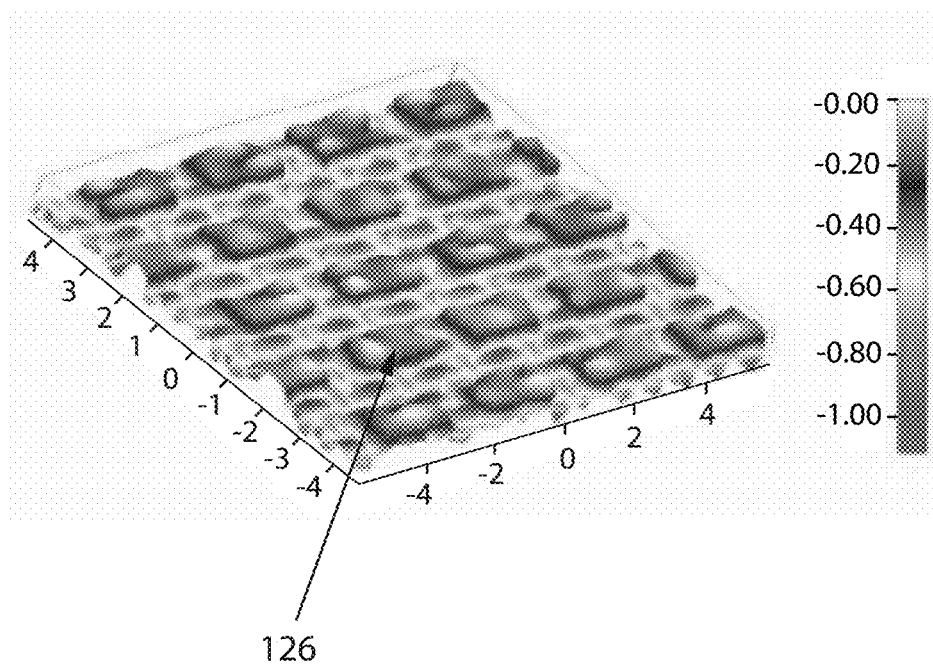

FIGS. 9A and 9C each illustrate an exemplary sheet product produced on a belt of the invention having a patterned surface utilizing the general discretization strategy disclosed herein. The length of fibers and/or the nature of the interconnectivity of a web produced on an industrial fabric, such as a texturing belt, of the invention would still allow for clear pattern definition in the web without the need for a continuously filled in lattice pattern deposition. FIG. 9A shows a resultant sheet product, and FIG. 9B shows the deposition structure used to make the resultant sheet product of FIG. 9A. FIG. 9C shows a 3D height map of a resultant sheet product, and FIG. 9D shows the deposition structure used to make the resultant sheet product of FIG. 9C.

FIGS. 10A, 10B, 10C, and 10D show a resin deposition on a fabric surface where the black deposition of discontinuous rectangles (119) is more porous than the white deposition of solid rectangles (126) with the same end effect created in a sheet product formed on each of these surfaces. That is, the same texture effectively results in the sheet product produced on each belt. Otherwise stated, functionally, the same overall impression or texture in the sheet product is made by both depositions, i.e., a pattern of rectangles in this example. The more open black structure of FIGS. 10A and 10B increases permeability by 50 CFM over the belt with the white solid pattern elements of FIGS. 10C and 10D. The open black structure is formed with discrete, non-adjoining subunits (119).

FIGS. 11-17 show belts of the invention with exemplary discretized resin pattern elements as compared against belts without the discretized resin pattern elements. The patterned belts in FIGS. 11-17 were subjected to a flex test. A photocurable resin that was approximately 0.50 mm height was used in the belts. This resin was applied to a belt that is a single layer with an 18/cm mesh×23/cm count, 0.30 mm shute, 0.30 mm warp, and 500 CFM air permeability. The flex test was run at 1,256,000 cycles (with 48 run hours) under dry conditions. The belt widths of the samples are 4.75 in (0.12 m), the belt lengths are 2.3 m, the belt tensions are 30 PSI set point (5.4 kN/m belt tension), and the belt speeds are 519.4 m/min for each flex test. In the embodiments of FIGS. 11-17, heat was added to the tested belts via a heat gun that can be attached to an air chamber. The belt surface was heated to ~150° C. A heat gun was employed to simulate the temperature that a belt will see on a commercial machine. Photos were taken with a digital microscope for analysis of material behavior over time. The photos can be taken at intermittent intervals during flex testing and show, e.g., surface wear, cracking, and delamination, and potentially show when a belt may begin to fail, and can highlight longevity differences between material. Moreover, the optional additional use of a gauge can measure a belt's surface temperature with an infrared laser temperature sensor, which also allows a design comparison of surface wear, cracking, and delamination between prior-art belts and a belt of the invention.

The results from the above flex testing showed cracking and surface abrasion/flattening in the continuous pattern elements. In contrast, no cracking or peeling was seen in the discretized pattern elements with minimal or little to no surface abrasion/flattening evident.

FIG. 11A shows a discretized hexagon shape with round subunits (120), showing the shape (top panel) and the color-coded three-dimensional height map showing the shape atop a woven base fabric (bottom panel). FIG. 11B shows a discretized hexagon shape with square subunits (121), showing the shape (top panel) and the color-coded three-dimensional height map showing the shape atop a woven base fabric (bottom panel). FIG. 11C shows a solid hexagon shape with round holes (122), showing the shape (top panel) and the color-coded three-dimensional height map showing the shape atop a woven base fabric (bottom panel). FIG. 11D shows a solid hexagon shape with square holes (123), showing the shape (top panel) and the color-coded three-dimensional height map showing the shape atop a woven base fabric (bottom panel). Generally, the air permeability of the base fabric is 472 CFM. The air permeability of the discrete square subunits atop the base fabric (FIG. 11B) is 295 CFM. And the air permeability of the solid (or filled) hexagon with square holes atop the base fabric (FIG. 11D) is 127 CFM.

Figure 12B:
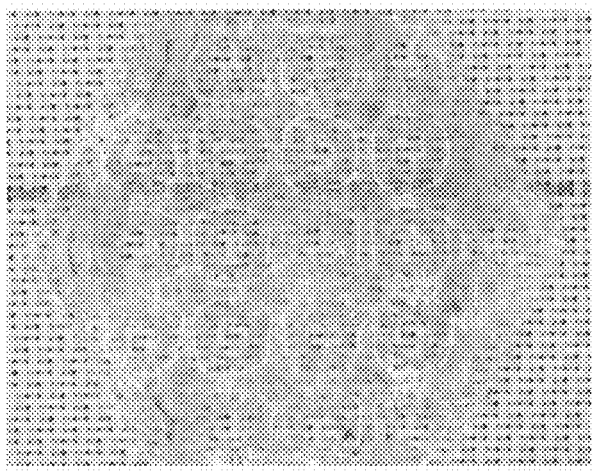
FIG. 12B shows a belt with solid hexagonal shape (pattern element) with round holes after a flex test.
Figure 12C:
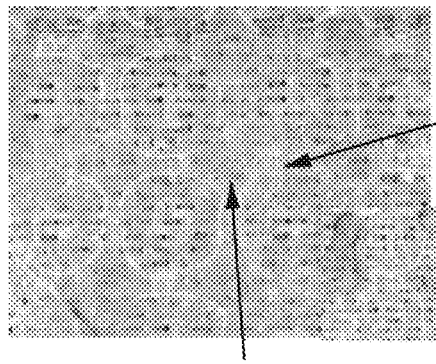
FIGS. 12C-12E show the belt with solid hexagonal shape (pattern element) with round holes (portions of FIG. 12B enlarged) after flex testing.
Figure 12D:
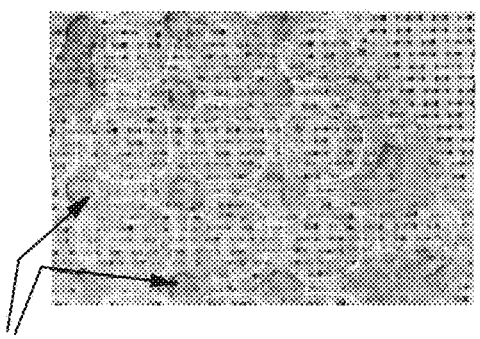
Figure 12E:
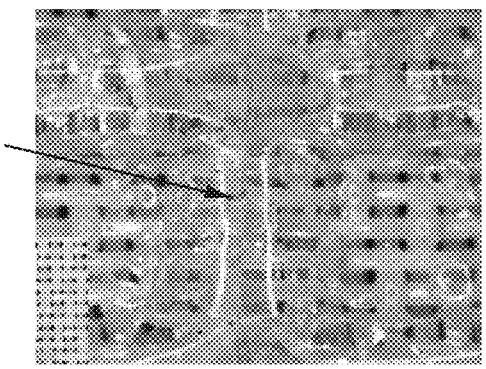
Figure 12F:
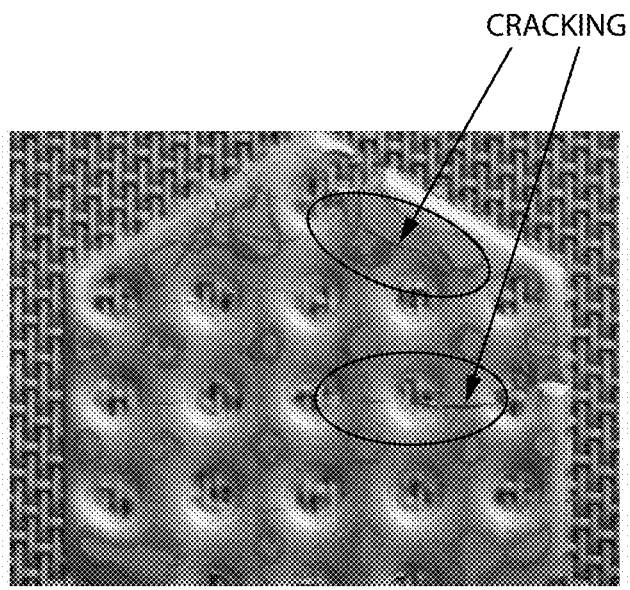
FIG. 12F shows a color-coded 3D height map image, with the color to aid in seeing the damage, e.g., stress fracture (cracking), in the structure after flex testing. Thin dark grey lines indicating cracking in the resin are encircled by a black oval to show examples of cracking.

FIG. 12A shows a solid hexagonal shape with round holes before flex testing. FIG. 12B shows the solid hexagonal shape with round holes after flex testing. FIGS. 12C-12E show the solid hexagonal shape with round holes (portions of FIG. 12B enlarged) after flex testing with cracking (124) and abrasion from roll contact (125). FIG. 12F is a color-coded three-dimensional height map to more easily show the damage to the deposition after flex testing due to the continuous nature of the deposition. The dark gray lines represent damage such as cracking.

Figure 13A:
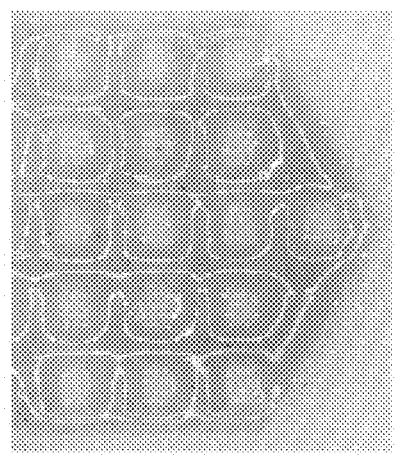
FIG. 13A shows a belt with solid hexagonal shape (a pattern element) with square holes before being subjected to flex testing.
Figure 13B:
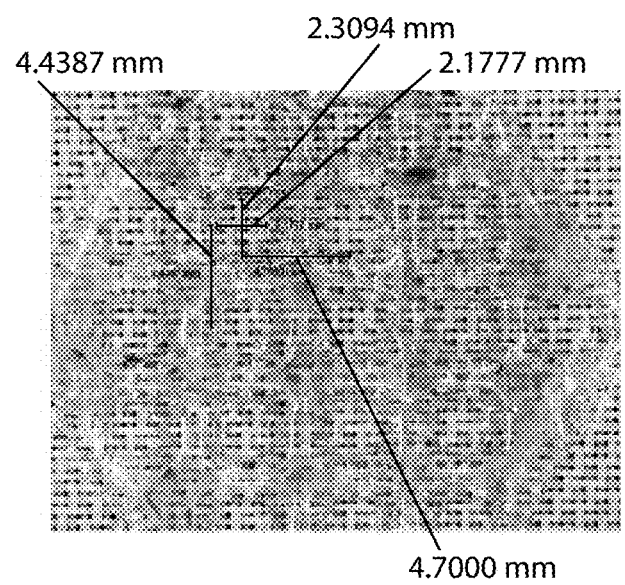
FIG. 13B shows a belt with solid hexagonal shape (pattern element) with square holes after flex testing.
Figure 13C:
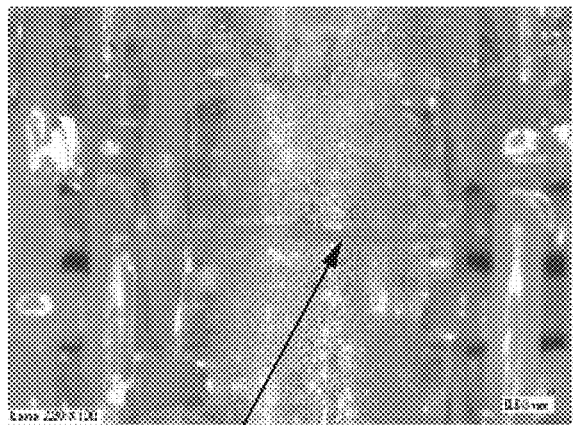
FIGS. 13C and 13D show the belt with the solid hexagonal shape (pattern element) with square holes (portions of FIG. 13B enlarged).
Figure 13D:
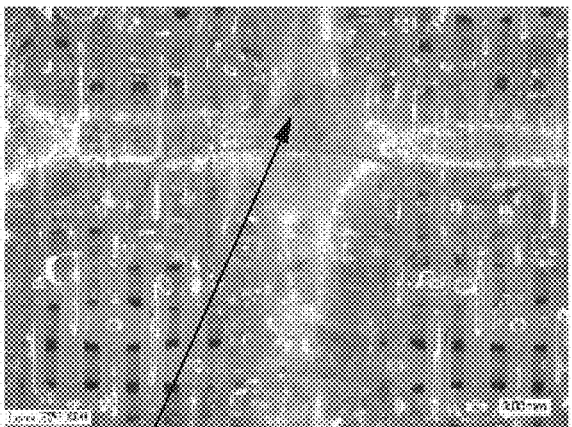
Figure 13E:
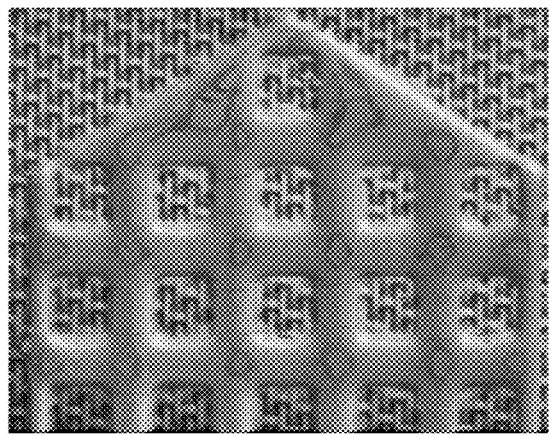
FIG. 13E shows a color-coded 3D height map image, with the color to aid in seeing the damage, e.g., stress fracture (cracking), in the structure after flex testing. The dark grey lines depict cracking in the resin.

FIG. 13A shows a solid hexagonal shape with square holes before flex testing. FIG. 13B shows the solid hexagonal shape with square holes after flex testing. FIGS. 13C and 13D show the solid hexagonal shape with square holes (portions of FIG. 13B enlarged) after flex testing with cracking (127) and abrasion (128) from roll contact. FIG. 13E is a color-coded three-dimensional height map to more easily show the damage to the deposition after flex testing due to the continuous nature of the deposition. The dark gray lines represent areas of damage such as cracking.

Figure 14A:
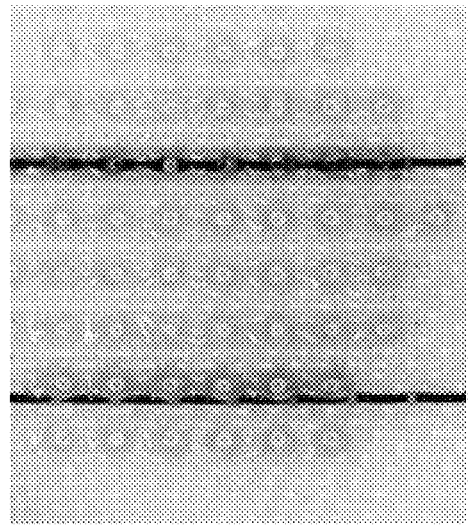
FIGS. 14A and 14B show a belt with a discretized hexagonal shape (a pattern element) with round subunits before being subjected to flex testing.
Figure 14B:
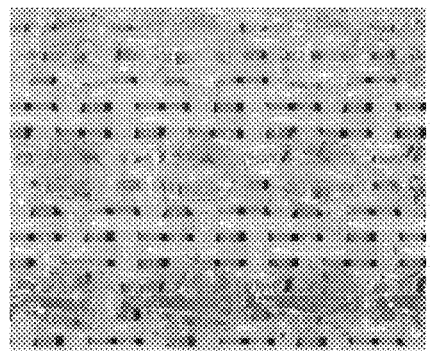
Figure 14C:
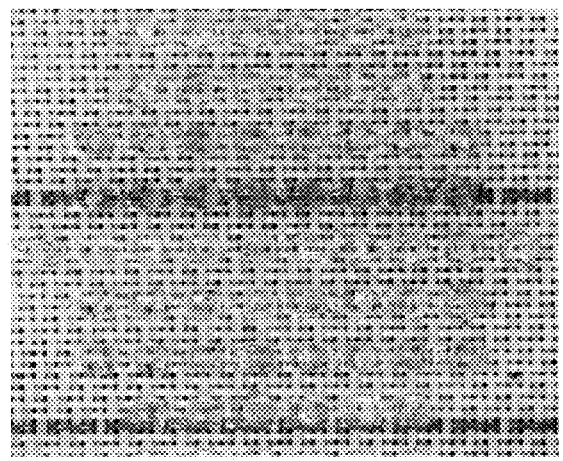
FIG. 14C shows a belt with discretized hexagonal shape (pattern element) with round subunits after flex testing.
Figure 14D:
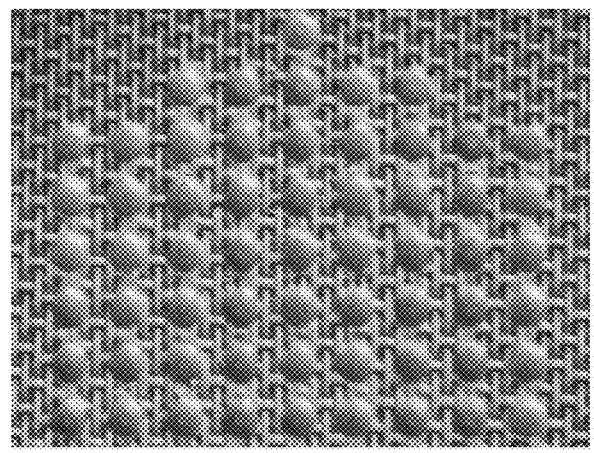
FIG. 14D shows a color-coded 3D height map image of the tested belt showing no detectable cracks or damage.

FIGS. 14A and 14B show a discretized hexagonal shape with round subunits before flex testing. FIG. 14C shows a discretized hexagonal shape with round subunits after flex testing. FIG. 14D is a color-coded three-dimensional height map. FIG. 14D shows no cracking or delamination after flex testing, only some abrasion.

Figure 15A:
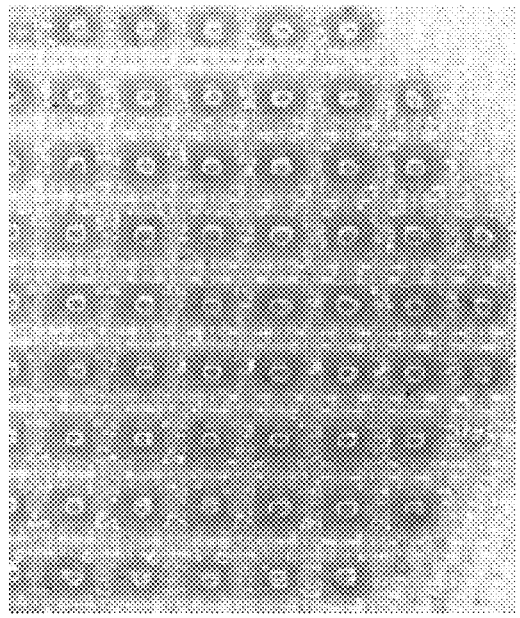
FIGS. 15A and 15B show a belt with a discretized hexagonal shape (a pattern element) with square subunits before being subjected to flex testing.
Figure 15B:
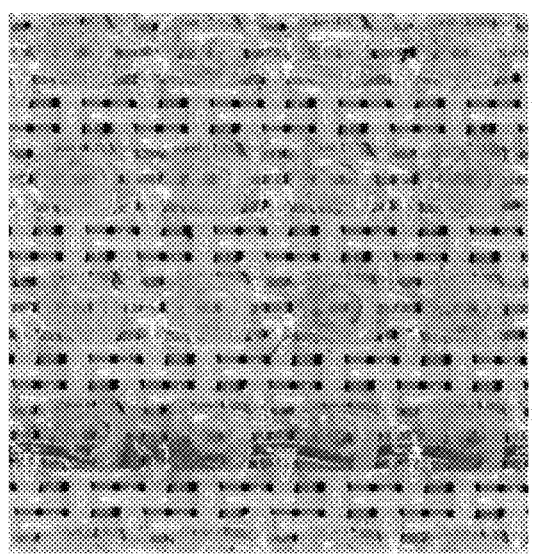
Figure 15C:
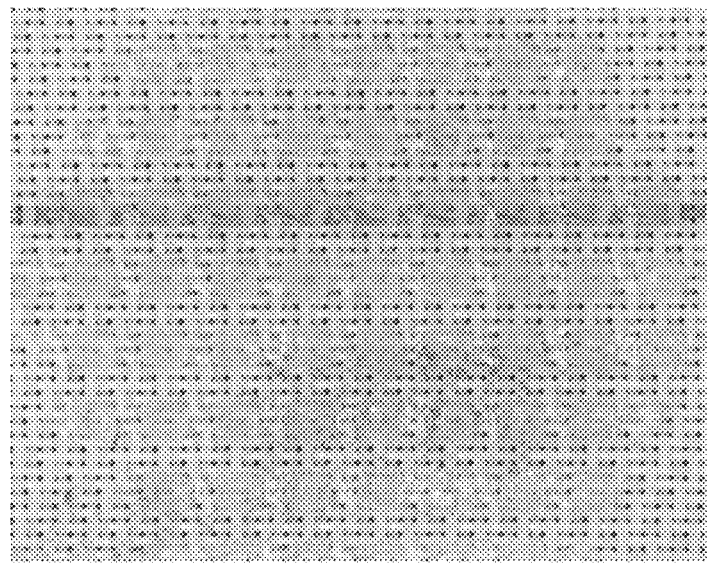
FIG. 15C shows a belt with a discretized hexagonal shape (pattern element) with square subunits after flex testing.
Figure 15D:
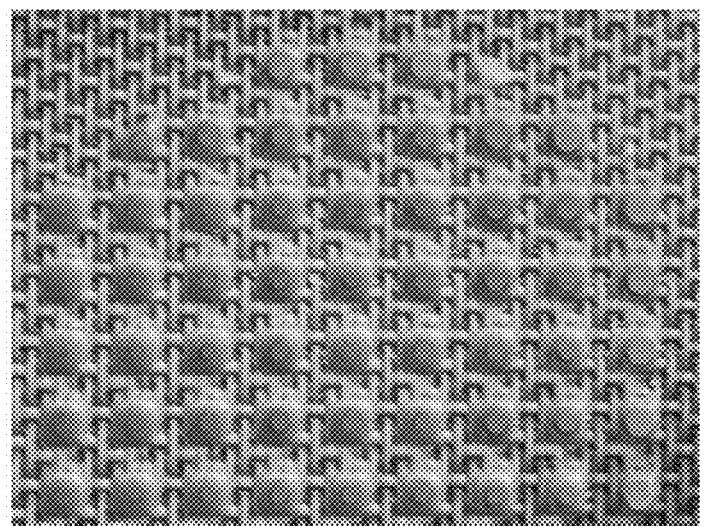
FIGS. 15D and 15E show a color-coded 3D height map image of the tested belt showing no detectable cracks or damage.
Figure 15E:
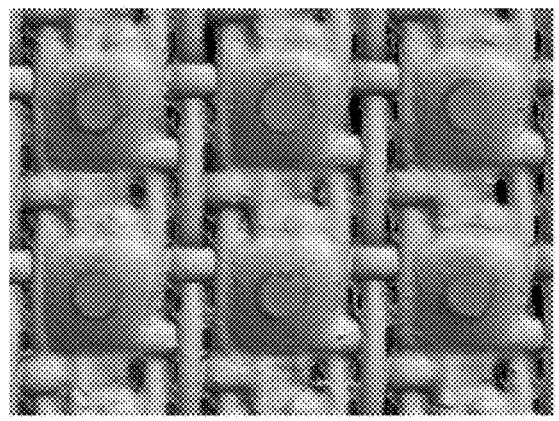

FIGS. 15A and 15B show a discretized hexagonal shape with square subunits before flex testing. FIG. 15C shows a discretized hexagonal shape with square subunits after flex testing. FIGS. 15D and 15E are color-coded three-dimensional height maps. FIGS. 15D and 15E show no cracking or delamination after flex testing, only some abrasion.

Figure 16A:
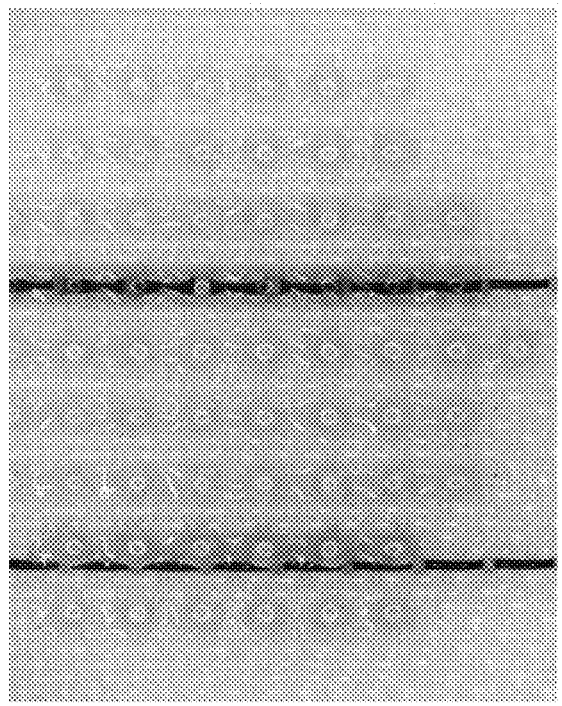
FIG. 16A shows a belt with a discretized hexagonal shape (a pattern element) with close spacing round subunits before being subjected to flex testing.

FIG. 16A shows a discretized hexagonal shape with close spacing round subunits before flex testing. FIG. 16B shows a discretized hexagonal shape with close spacing round subunits after flex testing.

Figure 17B:
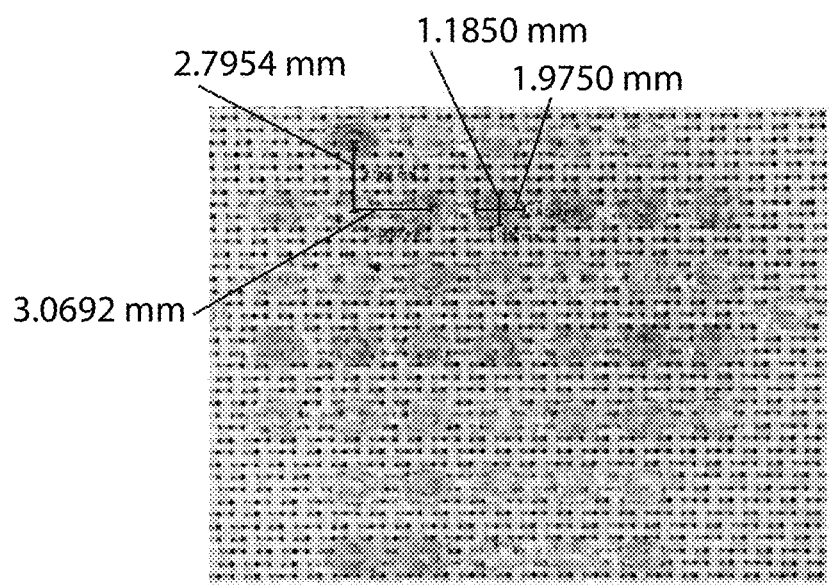
FIG. 17B shows a belt with a discretized hexagonal shape (pattern element) with coarse spacing round subunits after flex testing.
Figure 17C:
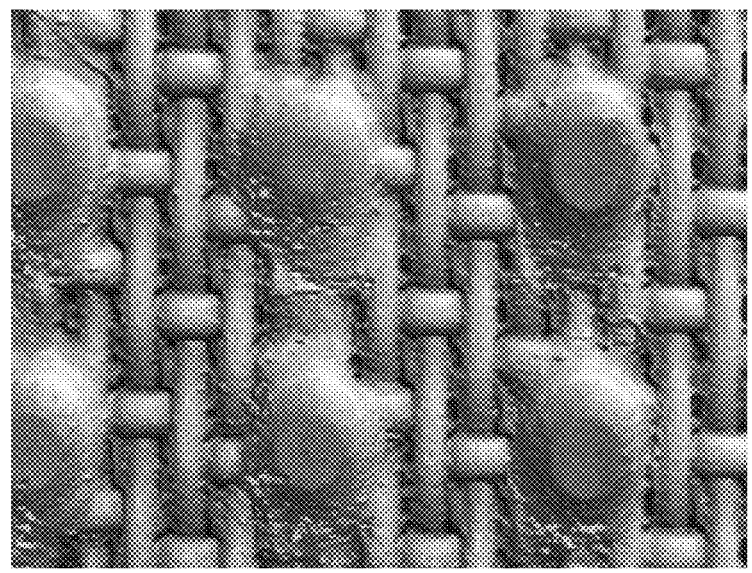
FIG. 17C shows a color-coded 3D height map image of the tested belt showing no detectable cracks or damage.

FIG. 17A shows a discretized hexagonal shape with coarse spacing round subunits before flex testing. FIG. 17B shows a discretized hexagonal shape with coarse spacing round subunits after flex testing. FIG. 17C is a color-coded three-dimensional height map. FIG. 17C shows no cracking or delamination after flex testing, only some abrasion.

FIGS. 18-20 concern fabric samples that were photographed in a Scanning Electron Microscope (SEM). The samples were photographed using a BSE (Backscattered Electron) detector. Generally, BSE detectors give an atomic number contrast to the pictures; substances with higher atomic number (fillers, etc.) look brighter compared to substances with lower atomic number (polymers, paper fibers, etc.).

Figure 18A:
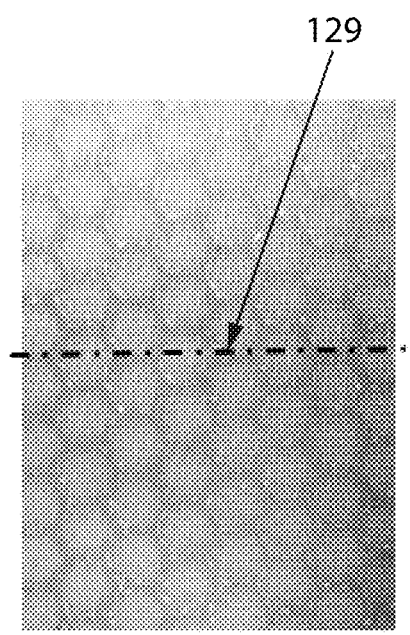
FIGS. 18A-18F show a top-down view and cross-sectional images of a belt using a scanning electron microscope (SEM) for the images.

FIG. 18A shows continuous hexagon pattern elements (solid lines outlining an open hexagonal space) that combine to form a lattice pattern on a belt from a top-down view. The lattice pattern contains hexagonal-shaped voids in a continuous lattice made from a resin. In FIG. 18A, the dotted line (129) shows where the belt was cut to produce the cross-sectional images using SEM as shown in FIGS. 18B-18F. FIGS. 18B-18F show cross-sectional measurements of the hexagonal lattice resin and the belt yarns at various sections along the cut belt of FIG. 18A.

Figure 18B:
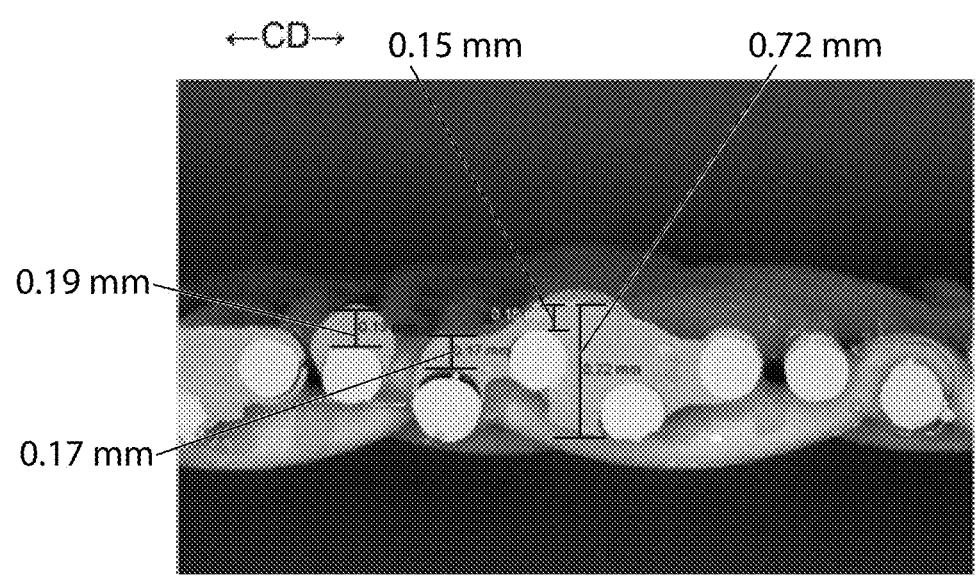

FIG. 18B shows cross-sectional measurements of 0.19 mm, 0.17 mm, and 0.15 mm resin thickness as between a topmost surface of the resin on the forming side surface of the belt and an MD yarn of the base fabric. FIG. 18B shows a cross-section measurement of 0.72 mm resin thickness as between a topmost surface of the resin on the forming side surface of the belt and a CD yarn of the base fabric.

Figure 18C:
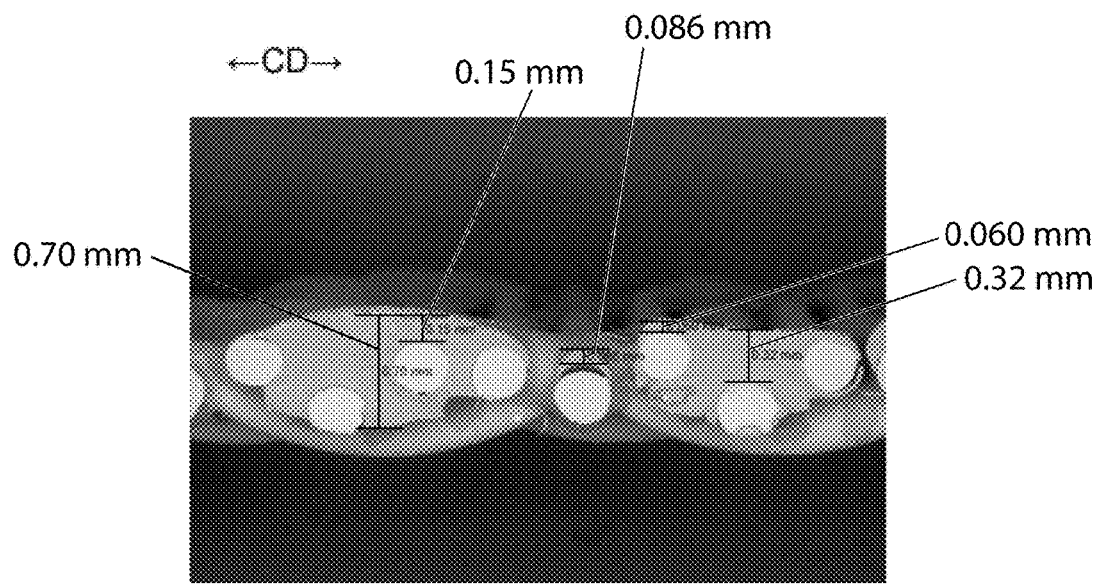

FIG. 18C shows cross-sectional measurements of 0.15 mm, 0.086 mm, 0.060 mm, and 0.32 mm resin thickness as between a topmost surface of the resin on the forming side surface layer of the belt an MD yarn of the base fabric. FIG. 18C shows a cross-section measurement of 0.70 mm resin thickness as between a topmost surface of the resin on the forming side surface of the belt and a CD yarn of the base fabric.

Figure 18D:
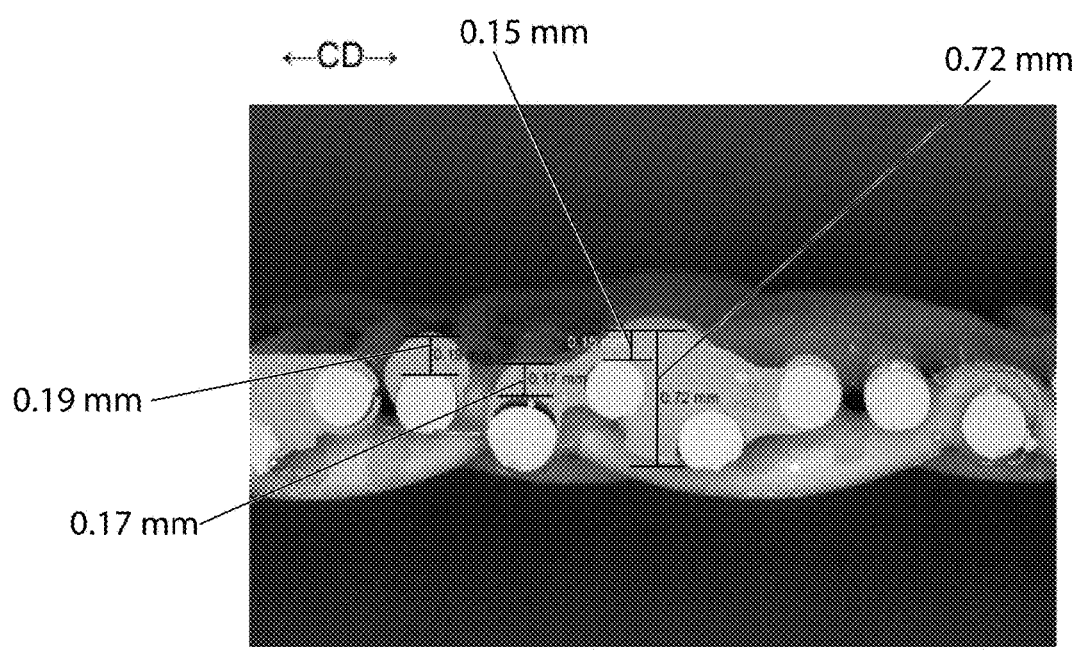

FIG. 18D shows cross-sectional measurements of 0.19 mm, 0.17 mm, and 0.15 mm resin thickness as between a topmost surface of the resin on the forming side surface of the belt and an MD yarn of the base fabric. FIG. 18D shows a cross-section measurement of 0.72 mm resin thickness as between a topmost surface of the resin on the forming side surface of the belt and a CD yarn of the base fabric.

Figure 18E:
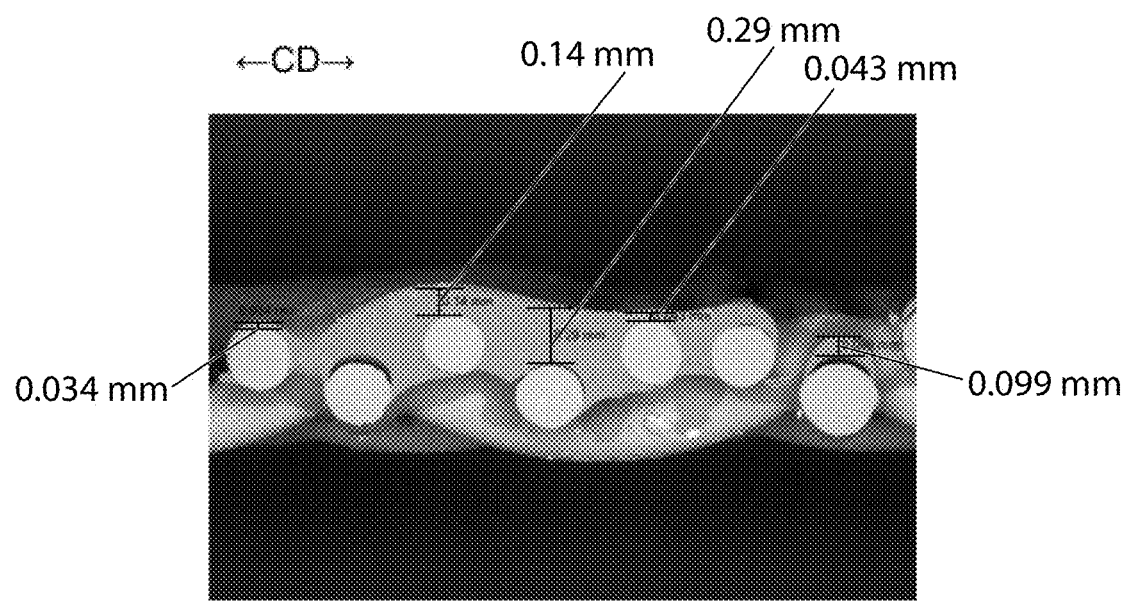

FIG. 18E shows cross-sectional measurements of 0.034 mm, 0.14 mm, 0.29 mm, 0.043 mm, and 0.099 mm resin thickness as between a topmost surface of the resin on the forming side surface of the belt and an MD yarn of the base fabric.

Figure 18F:
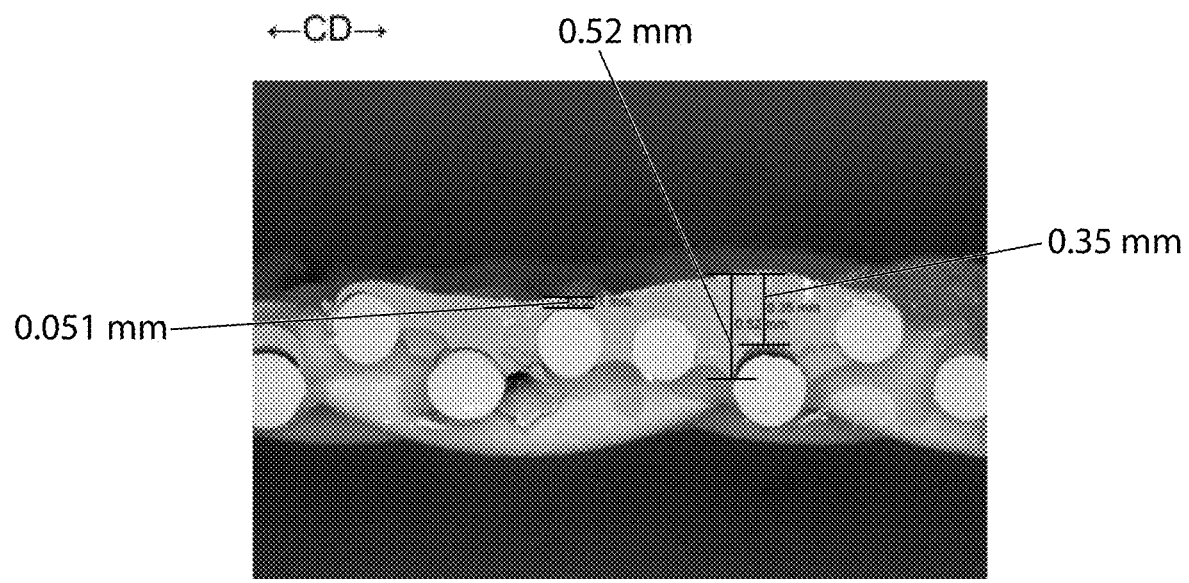
Figure 19A:
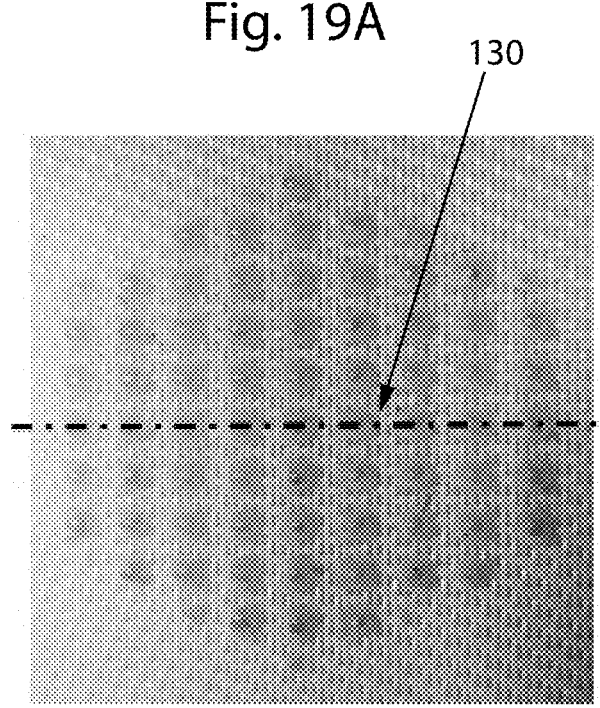
FIGS. 19A-19G show a top-down view and cross-sectional images of a belt using an SEM for the images.

And FIG. 18F shows cross-sectional measurements of 0.051 mm and 0.35 mm resin thickness as between a topmost surface of the resin on the forming side surface of the belt and an MD yarn of the base fabric. FIG. 18F shows a cross-section measurement of 0.52 mm resin thickness as between a topmost surface of the resin on the forming side surface of the belt and a CD yarn of the base fabric FIG. 19A shows a discretized hexagonal shape pattern element on a belt from a top-down view. The hexagonal shape is a discretized hexagonal pattern element made from subunits. In FIG. 19A, the dotted line (130) shows where the belt was cut to produce the cross-sectional images using SEM as shown in FIGS. 19B-19G. FIGS. 19B-19G show cross-sectional measurements of the hexagonal subunits and the belt yarns at various sections along the cut belt of FIG. 19A.

Figure 19B:
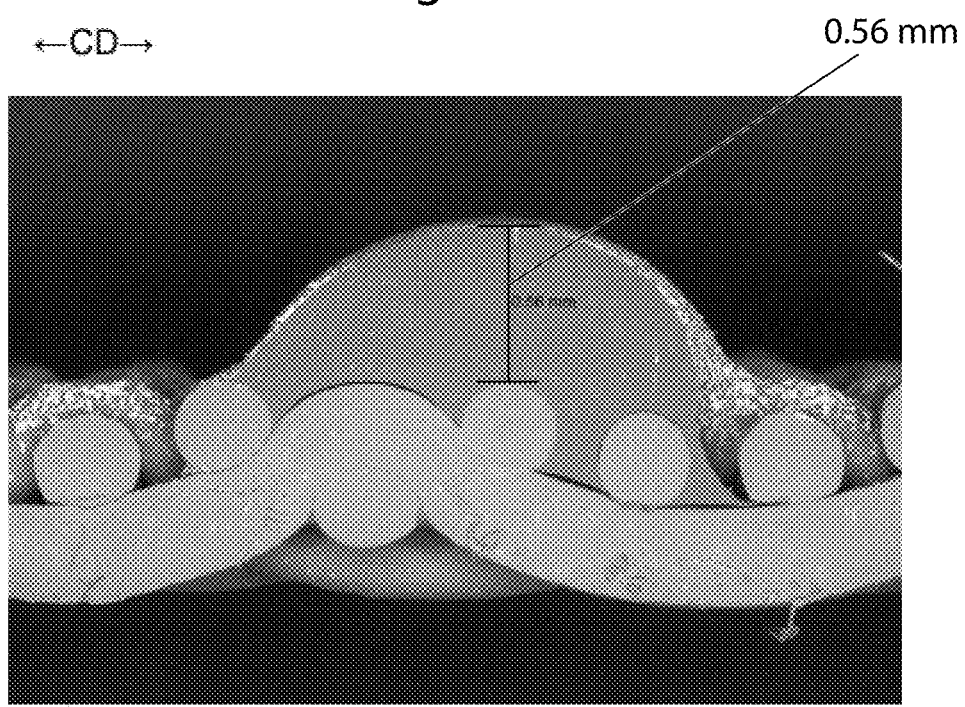

FIG. 19B shows a cross-sectional measurement of 0.56 mm subunit thickness as between a topmost surface of the subunit on the forming side surface of the belt and an MD yarn of the base fabric.

Figure 19C:
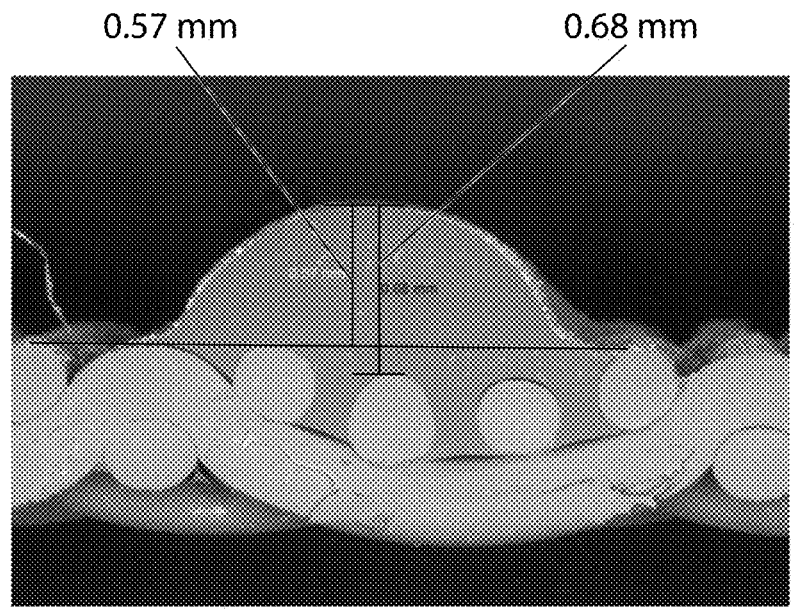

FIG. 19C shows cross-sectional measurements of 0.68 mm and 0.57 mm subunit thickness as between a topmost surface of the subunit on the forming side surface of the belt and an MD yarn of the base fabric.

Figure 19D:
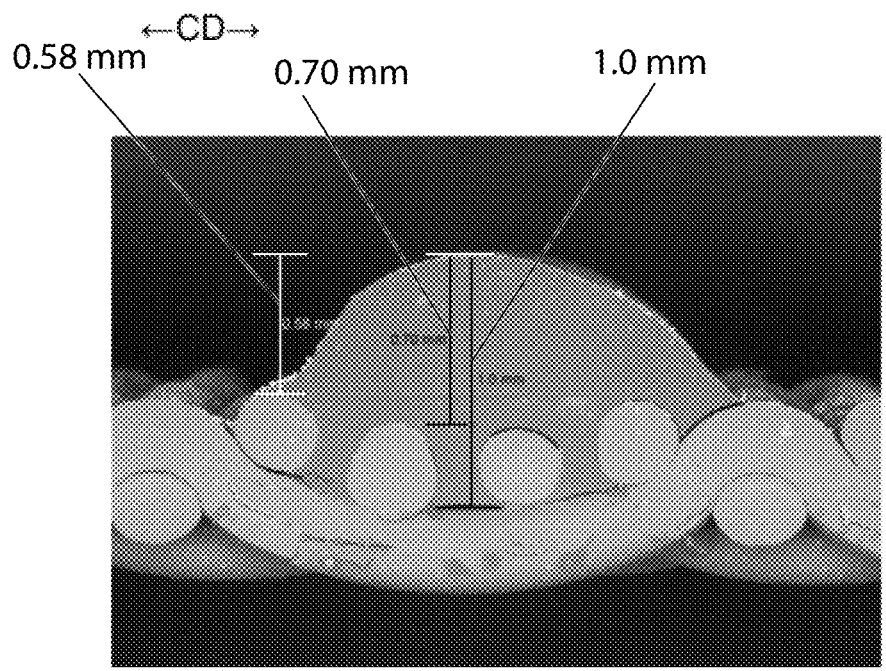

FIG. 19D shows cross-sectional measurements of 0.58 mm and 0.70 mm subunit thickness as between a topmost surface of the subunit on the forming side surface of the belt and an MD yarn of the base fabric. FIG. 19D shows a cross-section measurement of 1.0 mm subunit thickness as between a topmost surface of the subunit on the forming side surface of the belt and a CD yarn of the base fabric.

Figure 19E:
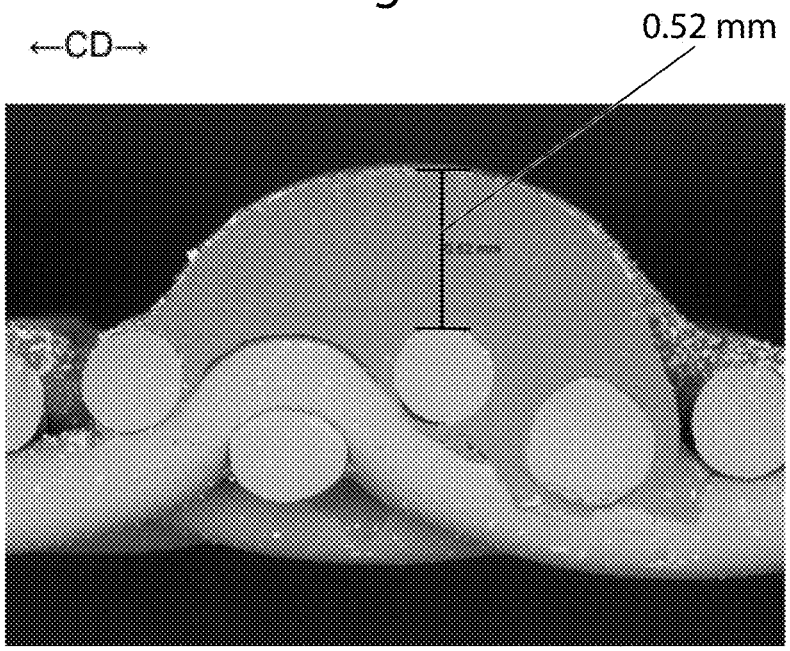

FIG. 19E shows a cross-sectional measurement of 0.52 mm subunit thickness as between a topmost surface of the subunit on the forming side surface of the belt and an MD yarn of the base fabric.

Figure 19F:
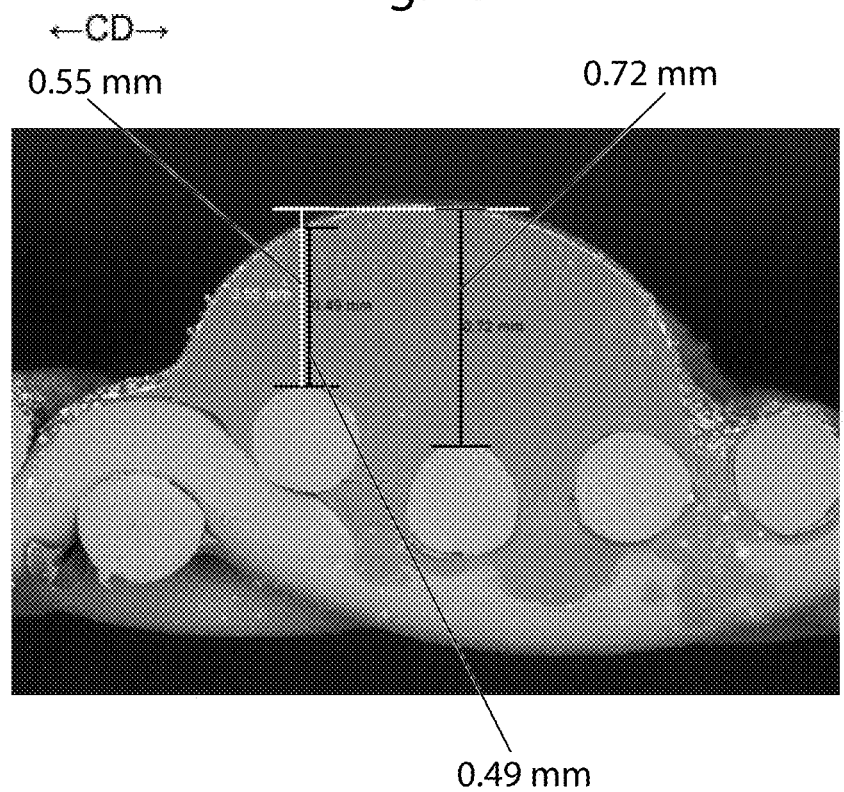

FIG. 19F shows cross-sectional measurements of 0.56 mm, 0.49 mm, and 0.72 mm subunit thickness as between a topmost surface of the subunit on the forming side surface of the belt and an MD yarn of the base fabric.

Figure 19G:
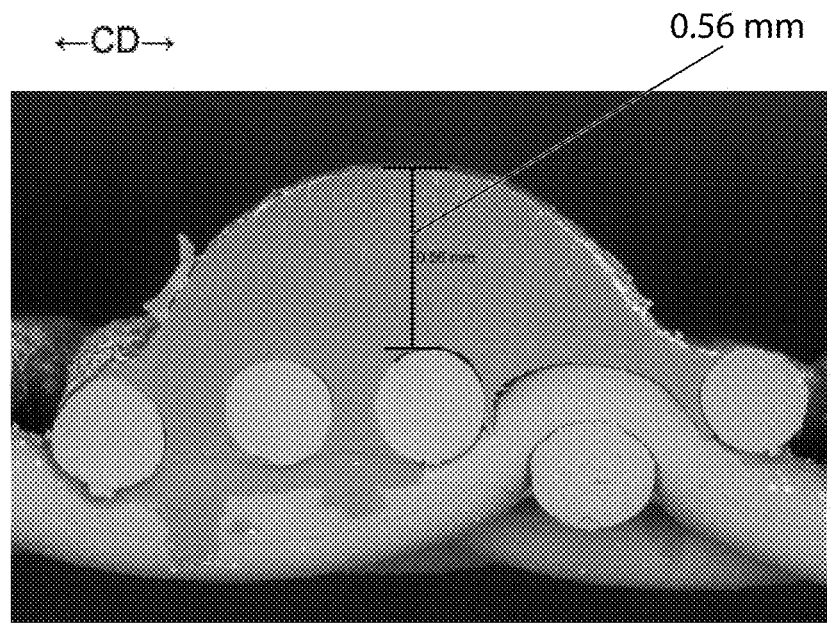

FIG. 19G shows a cross-sectional measurement of 0.56 mm subunit thickness as between a topmost surface of the subunit on the forming side surface of the belt and an MD yarn of the base fabric.

Figure 20A:
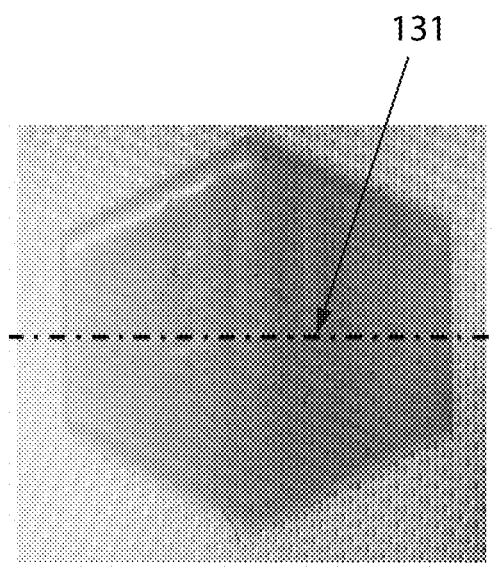
FIGS. 20A-20E show a top-down view and cross-sectional images of a belt using an SEM for the images.

FIG. 20A shows a continuous (solid) hexagon pattern element. In FIG. 20A, the dotted line (131) shows where the belt was cut to produce the cross-sectional images using SEM as shown in FIGS. 20B-20E. FIGS. 20B-20E show cross-sectional measurements of the hexagonal subunit and the belt yarns at various sections along the cut belt of FIG. 20A.

Figure 20B:
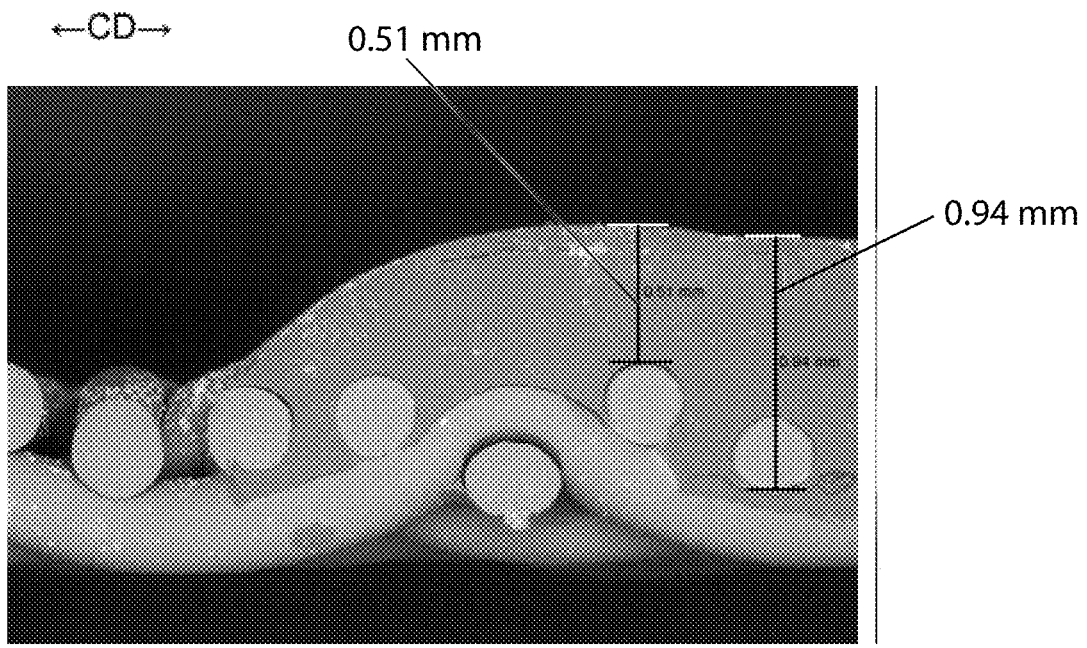

FIG. 20B shows a cross-sectional measurement of 0.51 mm resin thickness as between a topmost surface of the resin on the forming side surface of the belt and an MD yarn of the base fabric. FIG. 20B shows a cross-section measurement of 0.94 mm resin thickness as between a topmost surface of the resin on the forming side surface of the belt and a CD yarn of the base fabric.

Figure 20C:
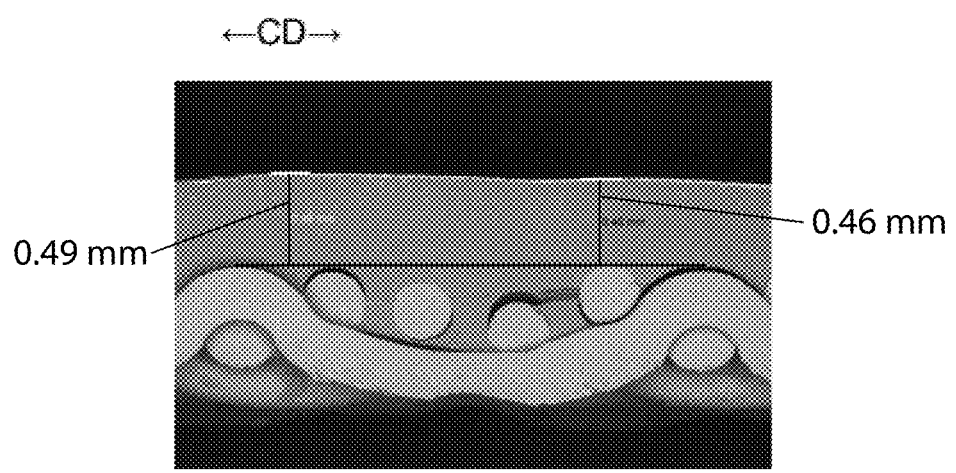

FIG. 20C shows cross-sectional measurements of 0.49 mm and 0.46 mm resin thickness as between a topmost surface of the resin on the forming side surface of the belt and an MD yarn of the base fabric.

Figure 20D:
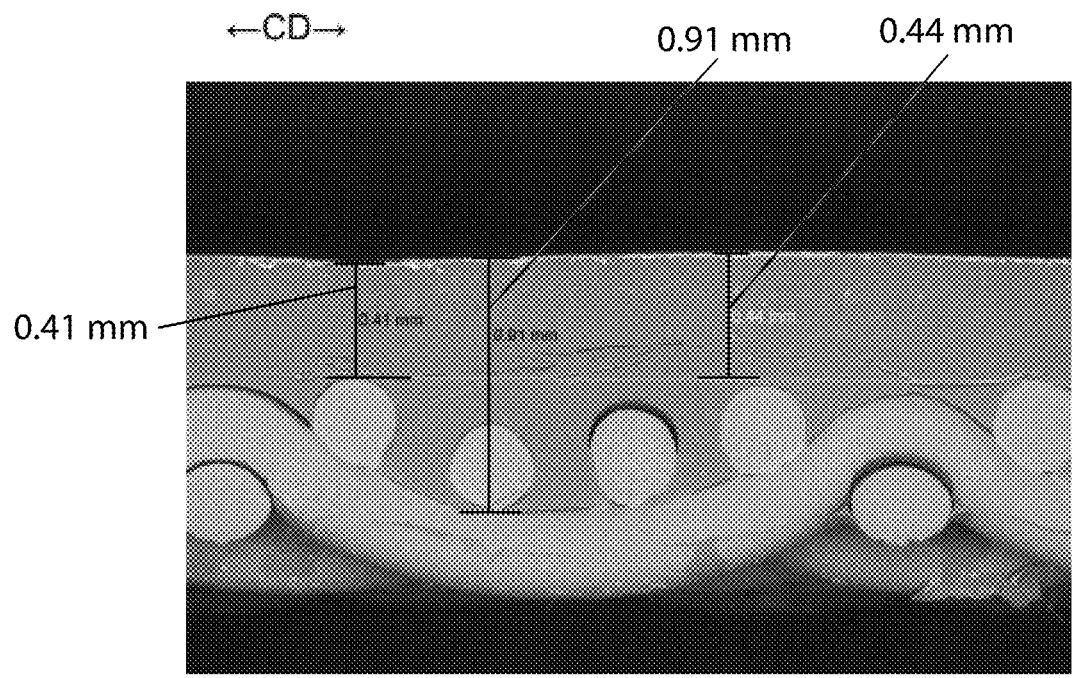

FIG. 20D shows cross-sectional measurements of 0.41 mm and 0.44 mm resin thickness as between a topmost surface of the resin on the forming side surface of the belt and an MD yarn of the base fabric. FIG. 20D shows a cross-section measurement of 0.91 mm resin thickness as between a topmost surface of the resin on the forming side surface of the belt and a CD yarn of the base fabric.

Figure 20E:
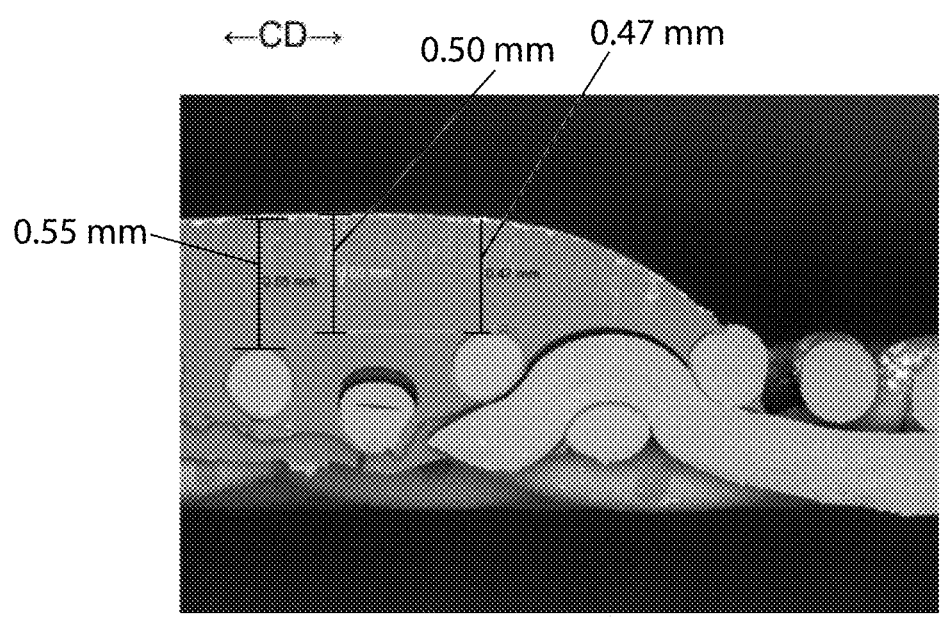

FIG. 20E shows cross-sectional measurements of 0.55 mm, 0.50 mm and 0.47 mm resin thickness as between a topmost surface of the resin on the forming side surface of the belt and an MD yarn of the base fabric.

Modifications to the above would be obvious to those of ordinary skill in the art, but would not bring the invention so modified beyond the scope of the present invention. The claims to follow should be construed to cover such situations.

The invention claimed is:

1. An industrial fabric for producing a textured product, the industrial fabric comprising:
   a first layer; and
   a second layer covering at least a portion of a top surface of the first layer, wherein the second layer comprises a plurality of non-adjoining subunits deposited on the top surface of the first layer to define a pattern comprising a pattern element having a discretized shape on the top surface of the first layer,
   wherein the plurality of non-adjoining subunits are positioned within a perimeter of the discretized shape of the pattern element and at least partially define the perimeter of the discretized shape of the pattern element.

2. The industrial fabric of claim 1, wherein the plurality of non-adjoining subunits each have a three-dimensional shape.

3. The industrial fabric of claim 2, wherein the three-dimensional shape of the plurality of non-adjoining subunits comprises at least one shape selected from the group consisting of: a cube, a column, a pyramid, a cone, a prism, a sphere, an ellipsoid, and a tetrahedrons.

4. The industrial fabric of claim 1, wherein the pattern is a complex pattern.

5. The industrial fabric of claim 1, wherein the first layer comprises at least one base fabric selected from the group consisting of: a woven fabric, a nonwoven fabric, a laminate, and a composite fabric.

6. The industrial fabric of claim 1, wherein the first layer comprises a nonwoven fabric, and the nonwoven fabric comprises at least one fiber structure selected from the group consisting of: a machine direction yarn array, a cross-machine direction yarn array, a braid, a series of independent rings, a spiral linked fabric, an extruded mesh, a knitted structure, a foil, a film, a spunbond fabric, a carded fiber, a needled fiber, an airlaid fiber, a melt blown fiber, and a wetlaid fiber structure.

7. The industrial fabric of claim 1, wherein the plurality of non-adjoining subunits comprise at least one material selected from the group consisting of: engineered polymers, thermoplastics, thermoplastic polyurethane, polyamides, polyesters, co-polyesters, ethylene-vinyl acetate (EVA), and thermosets.

8. The industrial fabric of claim 7, wherein the at least one material comprises the thermoset, and the thermoset is a catalyzed, moisture-cured, thermal-activated, or photo-activated polymer system.

9. The industrial fabric of claim 1, wherein the industrial fabric has a permeability that is 10 to 90% greater than a permeability of an industrial fabric with a continuous pattern element.

10. The industrial fabric of claim 1, wherein the plurality of non-adjoining subunits of the second layer extend over a length and/or a width of the first layer.

11. The industrial fabric of claim 1, wherein the pattern element comprises at least one element selected from the group consisting of: a round shape, a polygonal shape, a line, a curve, a letter, a number, a word, a logo, a trademark, an animal, a plant, a food, a person, and a terrain.

12. The industrial fabric according to claim 1, wherein the industrial fabric is a texturing belt or processing belt.

13. The industrial fabric according to claim 1, wherein the plurality of non-adjoining subunits comprise an inter-subunit spacing configured to minimize substantial fiber penetration of the textured product into an area between the plurality of non-adjoining subunits of the pattern element when the industrial fabric is used to produce the textured product.

14. The industrial fabric according to claim 1, wherein the plurality of non-adjoining subunits of the pattern element comprise an inter-subunit spacing defining an area between the plurality of non-adjoining subunits, the area between the plurality of non-adjoining subunits sized to cause fibers of the textured product to extend across the area between the plurality of non-adjoining subunits when the industrial fabric is used to produce textured product.

15. The industrial fabric according to claim 1, wherein one or more of the non-adjoining subunits of the second layer are in-plane with a surface of the first layer.

16. The industrial fabric according to claim 1, wherein the industrial fabric comprises three or more layers, the three or more layers comprising the first layer and the second layer.

17. The industrial fabric of claim 16, wherein the three or more layers comprises a third layer comprising at least one base fabric selected from the group consisting of: woven fabrics, nonwovens, laminates, and composites.

18. The industrial fabric according to claim 1, further comprising a third layer, wherein the third layer is a base fabric, and wherein the first layer covers at least a portion of a top surface of the third layer.

19. The industrial fabric of claim 1, wherein the perimeter of the discretized shape of the pattern element is at least partially defined by the plurality of non-adjoining subunits and an area between the plurality of non-adjoining subunits.

20. The industrial fabric of claim 1, wherein shapes of the plurality of non-adjoining subunits are uniform and extend across an area defined by the perimeter of discretized shape of the pattern element.

21. The industrial fabric of claim 20, wherein the second layer comprises one or more non-adjoining subunits positioned within the perimeter of the discretized shape of the pattern element, and wherein the one or more non-adjoining subunits does not adjoin the plurality of non-adjoining subunits and comprises a shape distinct from the shapes of the plurality of non-adjoining subunits.

22. The industrial fabric of claim 21, wherein the one or more non-adjoining subunits at least partially defines the perimeter of the discretized shape of the pattern element.

23. The industrial fabric of claim 1, wherein:
the pattern element is a first pattern element, and the plurality of non-adjoining subunits is a first plurality of non-adjoining subunits; and
the second layer comprises a second plurality of non-adjoining subunits to define a second pattern element having a discretized shape on the top surface of the first layer, the discretized shape of the second pattern element being defined by a perimeter, wherein the second plurality of non-adjoining subunits are positioned within the perimeter of the discretized shape of the second pattern element and at least partially define the perimeter of the discretized shape of the second pattern element.

24. The industrial fabric of claim 23, wherein the discretized shape of the first pattern element and the discretized shape of the second pattern element are spaced apart from one another.

25. The industrial fabric of claim 1, wherein a length of a subunit of the plurality of non-adjoining subunits is no more than 1 mm.

26. The industrial fabric of claim 1, wherein the first layer comprises a first region where the plurality of non-adjoining subunits are distributed and a second region where the plurality of non-adjoining subunits are not distributed, wherein the second region surrounds the first region to at least partially define the discretized shape of the pattern element.

27. A method of producing a textured product comprising: texturing a product with an industrial fabric, the industrial fabric comprising:
a first layer; and
a second layer covering at least a portion of a top surface of the first layer, wherein the second layer comprises a plurality of non-adjoining subunits deposited on the top surface of the first layer to define a pattern comprising a pattern element having a discretized shape on the top surface of the first layer,
wherein the plurality of non-adjoining subunits are positioned within a perimeter of the discretized shape of the pattern element and at least partially define the perimeter of the discretized shape of the pattern element.

28. The method of claim 27, wherein the plurality of non-adjoining subunits each have a three-dimensional shape.

29. The method of claim 27, wherein the pattern element comprises at least one element selected from the group consisting of: a round shape, a polygonal shape, a line, a curve, a letter, a number, a word, a logo, a trademark, an animal, a plant, a food, a person, and a terrain.

* * * * *